(12) United States Patent
Eskandari

(10) Patent No.: US 7,813,951 B2
(45) Date of Patent: Oct. 12, 2010

(54) MANAGING CUSTOMER LOSS USING A GRAPHICAL USER INTERFACE

(75) Inventor: Ramine Eskandari, Heidelberg (DE)

(73) Assignee: SAP AG, Walldorf (DE)

( * ) Notice: Subject to any disclaimer, the term of this patent is extended or adjusted under 35 U.S.C. 154(b) by 1451 days.

(21) Appl. No.: 10/452,910

(22) Filed: Jun. 3, 2003

(65) Prior Publication Data

US 2004/0034558 A1 Feb. 19, 2004

Related U.S. Application Data

(60) Provisional application No. 60/386,168, filed on Jun. 4, 2002.

(51) Int. Cl.
*G06F 17/30* (2006.01)

(52) U.S. Cl. ............................................. 705/10; 705/7

(58) Field of Classification Search ................. 705/10
See application file for complete search history.

(56) References Cited

U.S. PATENT DOCUMENTS

| | | | |
|---|---|---|---|
| 6,049,599 A | 4/2000 | McCausland et al. | |
| 6,173,310 B1 | 1/2001 | Yost et al. | |
| 6,266,668 B1 | 7/2001 | Vanderveldt et al. | |
| 6,272,478 B1 | 8/2001 | Obata et al. | |
| 6,301,471 B1 | 10/2001 | Dahm et al. | |
| 6,430,545 B1 | 8/2002 | Honarvar et al. | |
| 6,460,037 B1 | 10/2002 | Weiss et al. | |
| 6,510,457 B1 | 1/2003 | Ayukawa et al. | |
| 6,597,903 B1* | 7/2003 | Dahm et al. ................ | 455/405 |
| 6,915,270 B1* | 7/2005 | Young et al. ................ | 705/10 |
| 7,212,986 B1* | 5/2007 | Richardson et al. ........... | 705/9 |
| 7,376,603 B1* | 5/2008 | Mayr et al. .................. | 705/35 |

| | | | |
|---|---|---|---|
| 2002/0026394 A1* | 2/2002 | Savage et al. ................. | 705/34 |
| 2002/0165755 A1* | 11/2002 | Kitts ........................... | 705/10 |
| 2003/0200135 A1* | 10/2003 | Wright ......................... | 705/10 |

OTHER PUBLICATIONS

Yan et al, "Improving Prediction of Customer Behavior in Nonstationary Environments", Neural Networks 2001 Proceedings.*
Anderson, "Customer Relationship Management in an E-Business Environment", IEEE, 0/7803-7260-3/10, 2001.*
Mozer et al, "Predicting Subscriber Dissatisfaction and Improving Retention in the Wireless Telecommunications Industry", IEEE Transactions on Neural Networks, vol. 11, No. 3, May 2000.*

(Continued)

*Primary Examiner*—Beth V Boswell
*Assistant Examiner*—Thomas Mansfield
(74) *Attorney, Agent, or Firm*—Fish & Richardson P.C.

(57) ABSTRACT

A graphical user interface is provided for using a computer to manage customer loss. The graphical user interface includes an overview window and a customer profile window. The overview window is for customer churn information that is associated with a period of time. Customer churn information may include information related to customer churn rates, lost profits, likelihood-to-churn rates, and likelihood-to-churn rates for important customers. The customer profile window is for customer information associated with each of several groups of customers for which customer churn information is displayed in the overview window. Customer information may include information related to customer demographics, such as characteristics of customers who are likely to churn, are loyal or are valuable, or the geographic distribution of customers or a subset of customers.

26 Claims, 15 Drawing Sheets

OTHER PUBLICATIONS

Warren, "The Softer Side of Strategy Dynamics", Business Strategy Review, vol. 11, Issue 1, pp. 45-58, 2000.*

Office Action (U.S. Appl. No. 10/452,911), Nov. 28, 2007, 15 pages.
Office Action (U.S. Appl. No. 10/452,908), Dec. 11, 2007, 17 pages.

* cited by examiner

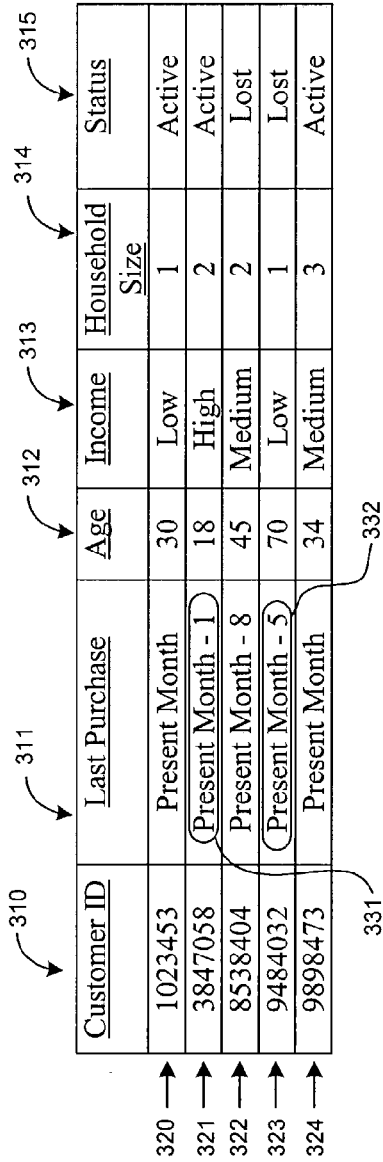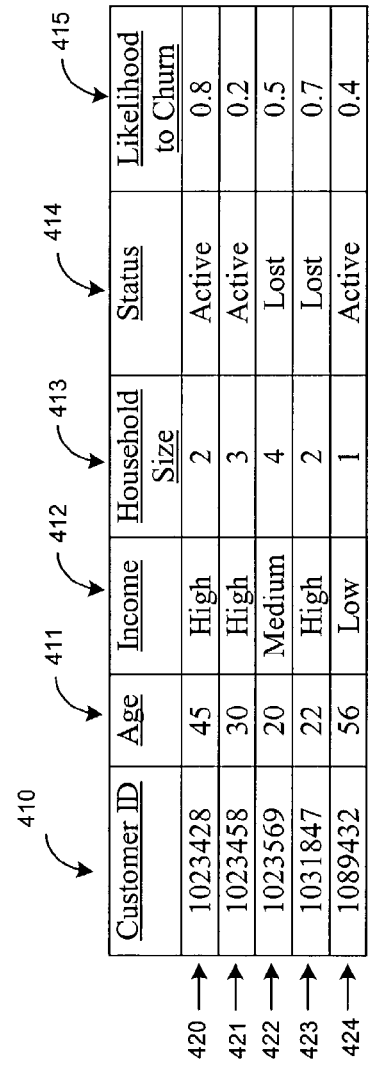

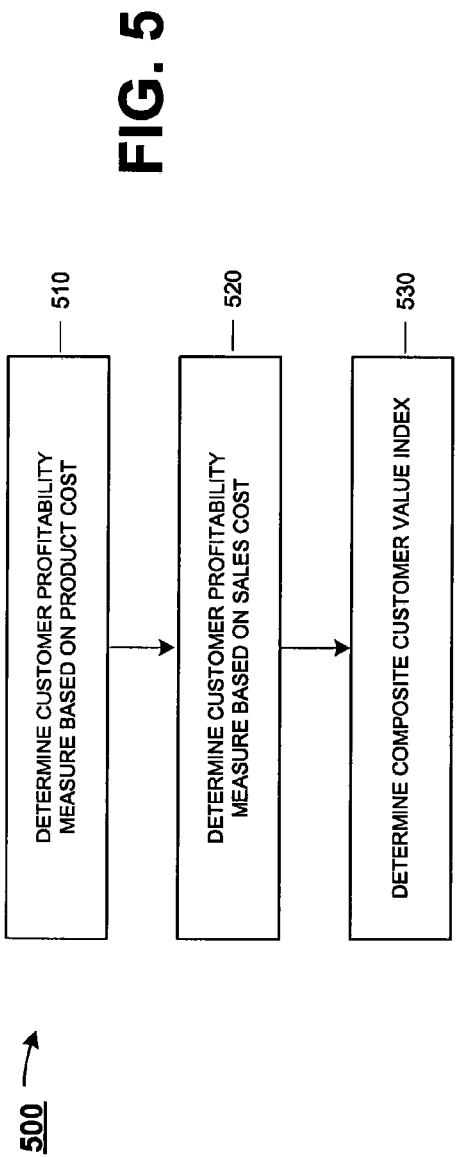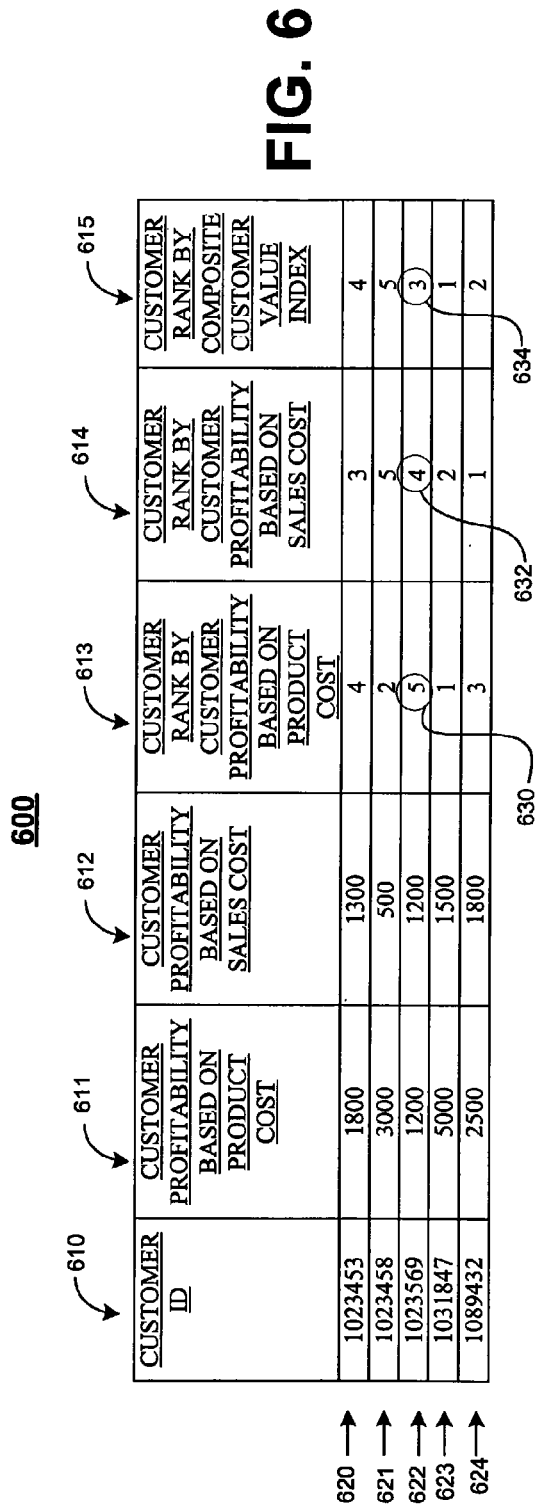

MANAGING CUSTOMER LOSS USING A GRAPHICAL USER INTERFACE

CROSS REFERENCE TO RELATED APPLICATION

This application claims priority from U.S. Provisional Application No. 60/386,168, titled "Methods and Systems for Churn Management" and filed Jun. 4, 2002.

TECHNICAL FIELD

This description relates to using a computer system to analyze customer attrition.

BACKGROUND

A computer system may be used to identify current customers of a business enterprise who are at-risk of ending the customer's business relationship with the business enterprise. For example, a customer may end a business relationship by switching to a competitor of the business enterprise for the purchase of a desired product or a desired service. A customer also may end a business relationship by refraining from purchasing any products or services. The process by which a customer puts an end to a business relationship with a business enterprise may be referred to as churn. Churn also may refer to the process of continually losing customers, which requires a business enterprise to acquire new customers, some of which are lost, which requires a business enterprise to acquire more new customers, and so on. The loss of customers also may be referred to as customer attrition. Churn management refers to the process of helping to ensure that customers stay with a business enterprise.

To help manage customer churn, a computer system may be used to analyze customer behavior to identify patterns. The business enterprise then may be able to take appropriate action to reduce the number of customers who are lost.

For example, customers that are at risk of being lost may be identified by special analyses, including statistical analyses. The likelihood that a customer will not purchase products or services in the future may be determined. This likelihood may be referred to as a likelihood-to-churn. A customer at risk of churning may be referred to as having a high likelihood-to-churn. A customer with a high likelihood-to-churn may be identified based on having similar characteristics to customers that have already ended their relationships with the business enterprise. The ability to identify a customer with a high likelihood-to-churn may be advantageous, particularly when steps may be taken to reduce the number of customers who are lost. An analysis to identity the likelihood-to-churn of a customer also may be referred to as a customer loyalty analysis.

For example, in the telecommunications industry a customer may be able to switch from one telecommunication provider to another telecommunications provider relatively easily. A telecommunications provider may be able to identify, using data mining techniques, particular customers that are likely to switch to a different telecommunications provider. The telecommunications provider may be able to provide an incentive to at-risk customers to decrease the number of customers who switch.

Reducing the loss of customers is important to the profitability of a business enterprise. Reducing customer attrition may be particularly important when the cost of replacing a customer with another customer takes a significant amount of time to recover, as may be the case in the telecommunications industry. Thus, the churn of customers may be a costly problem to a business enterprise.

SUMMARY

Generally, the invention provides a graphical user interface (GUI) for use by one user, typically an executive or high-level manager, for the purpose of reducing customer loss. The GUI allows the display and use of customer information related to customer loss that has been generated by another user, such as a business analyst or system administrator. The GUI includes an overview interface that provides access to information related to customer churn and a customer profile interface that provides access to information related to customer characteristics for groups of customers.

In one general aspect, a graphical user interface for using a computer to manage customer loss includes an overview display and a customer profile display. The overview display is for customer churn information that is associated with a period of time. The customer churn information includes an attribute and multiple values for the attribute. Each value is associated with a particular point within the period of time for which the customer churn information is being displayed. The customer profile display is for customer information associated with each of several groups of customers for which customer churn information is displayed in the overview display.

Implementations may include one or more of the following features. For example, the overview display may be an overview window in which the display position of the overview window on a display device is controllable by a user. The overview display also may be an overview pane in which the display position of the overview pane on a display device is fixed. Similarly, the customer profile display may be an customer profile window in wherein the display position of the customer profile window on a display device is controllable by a user, or may be a customer profile pane wherein the display position of the customer profile pane on a display device is fixed.

An attribute of the customer churn information may be a rate of customer churn for all customers of a business enterprise, an aggregated likelihood-to-churn based on a likelihood-to-churn for individual customers of a business enterprise, an aggregated likelihood-to-churn attribute based on the likelihood-to-churn for important customers of a business enterprise, or an estimate of lost profits due to lost customers. The importance of a customer may be based on a profitability value that represents the contribution of the customer to the business enterprise.

The customer profile information may include a likelihood-to-churn value for each customer group. The likelihood-to-churn value may represent an average likelihood-to-churn for all customers included in the customer group. The customer profile information may include a customer value attribute for each customer group, in which the customer value attribute represents an average customer value for all customers included in the customer group. The customer profile information may include a customer satisfaction attribute for each customer group, in which the customer satisfaction attribute represents an average satisfaction value for all customers included in the customer group. The customer profile information may include a customer loyalty attribute for each customer group, in which the customer loyalty attribute represents an estimate of customer loyalty for all customers included in the customer group.

Implementations of the graphical user interface discussed above may include a system or apparatus, or computer software on a computer-accessible medium. The details of one or more implementations of the invention are set forth in the accompanying drawings and the description below. Other features, objects, and advantages of the invention will be apparent from the description and drawings, and from the claims.

DESCRIPTION OF DRAWINGS

FIG. 3 is a block diagram that shows an example of results of determining a status of particular customers.

FIG. 4 is a block diagram that depicts an example of results of determining a likelihood-to-churn for particular customers.

FIG. 5 is a flow chart of a sub-process for determining a value measure for a customer.

FIG. 6 is a block diagram illustrating the results of determining a value measure for customers.

DETAILED DESCRIPTION

Figure 1:
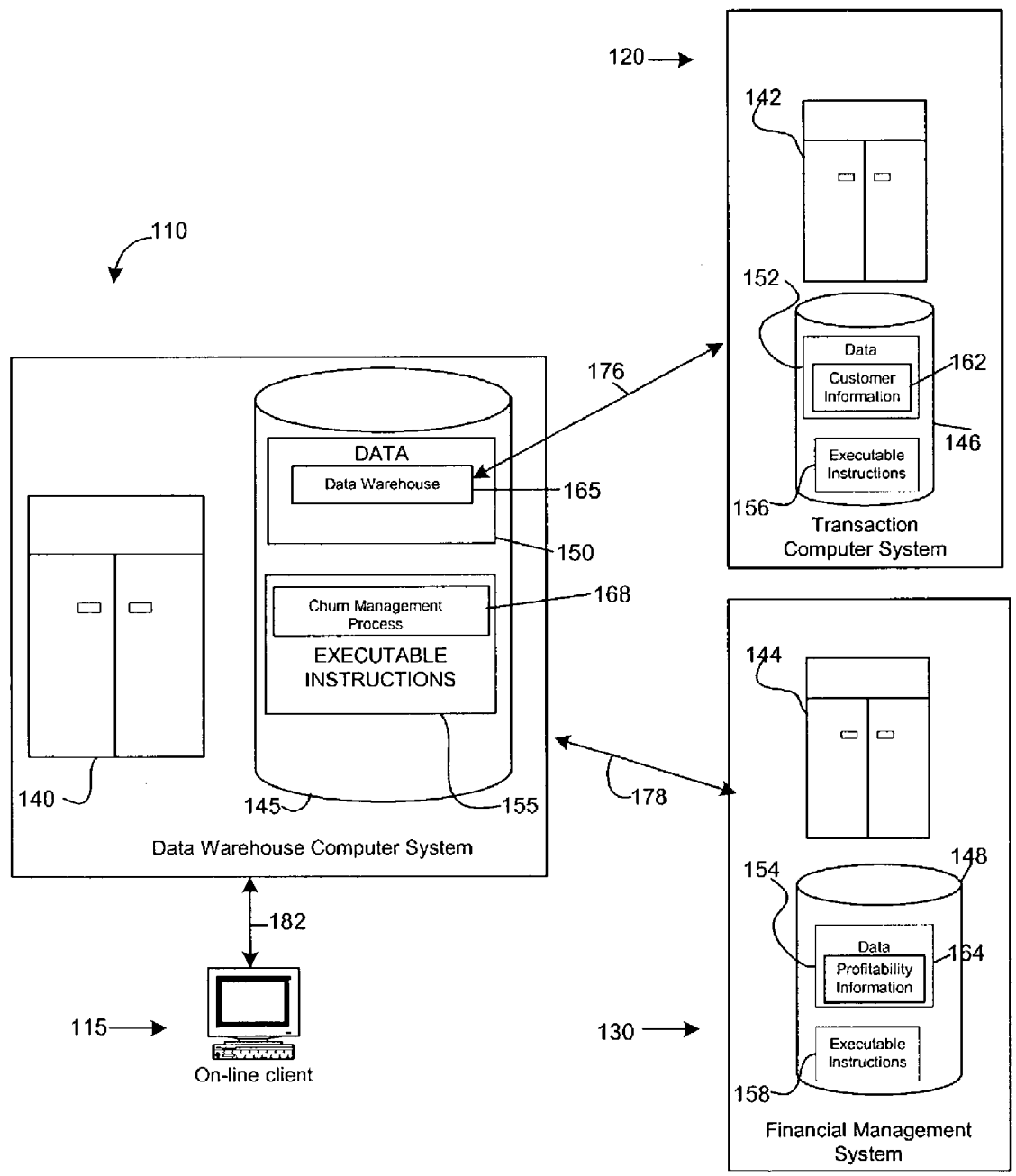
FIG. 1 is a block diagram of a system incorporating various aspects of the invention.

FIG. 1 shows a block diagram of a system 100 of networked computers, including a computer system 110 for a data warehouse, a transaction computer system 120, and a financial management system 130. The data warehouse 110 receives customer information from the transaction computer system 120 and profitability information from the financial management system 130. Using the received customer information and profitability information, the data warehouse 110 performs a churn management process to identify the business enterprise's most valuable customers that have a high likelihood of being lost.

The system 100 includes a computer system 110 for a data warehouse, a client computer 115 used to administer the data warehouse, a transaction computer system 120, and a financial management system 130, all of which are capable of executing instructions on data. As is conventional, each computer system 110, 120 or 130 includes a server 140, 142 or 144 and a data storage device 145, 146 or 148 associated with each server. Each of the data storage devices 145, 146 and 148 includes data 150, 152 or 154 and executable instructions 155, 156 or 158. A particular portion of data, here referred to as customer information 162 or profitability information 164, is stored in computer systems 120 and 130, respectively.

The customer information 162 includes information about multiple customer entities. Each customer entity has a collection of data attribute values, such as, for example, a customer number uniquely identifying the customer, a first name, a last name, an electronic mail address, a mailing address, a daytime telephone number, an evening telephone number, date of first purchase by the customer, date of the most recent purchase by the customer, birth date or age of customer, and the income level of customer. Each customer entity may be stored as a row in a relational database table, an object instance in an object-oriented database, data in an extensible mark-up language (XML) file, or a record in a data file.

The profitability information 164 includes profitability information about the business enterprise and particular aspects of providing products or services to customers. For example, the profitability information 164 may include volumes of products sold, gross sales, cost of goods sold (or other types of sales deductions), net sales, product costs, direct sales costs (such as campaign and promotional costs, customer-related order costs, customer-related shipment costs), and indirect sales costs (such as the cost of customer visits, customer support, and customer care). The costs included in profitability information 164 may be for a particular customer, a particular product or service, and/or aggregated for an organizational component or the business enterprise.

The data warehouse computer system 110 stores data, which is referred to as data warehouse 165. The data warehouse 165 is a central repository of data, in which data is extracted from another computer system, such as the extraction of customer information 162 from the transaction computer system 120 or the extraction of profitability information 164 from the financial management system 130. The data in the data warehouse 165 is used for special analyses, such as determining the likelihood of customer loss for the most valuable customers of the business enterprise. The results of the special analyses also are stored in the data warehouse 165.

The data warehouse computer system 110 includes a churn management process 168 that includes executable instructions for identifying valuable customers with a high likelihood of being lost, as described more fully below. The churn management process 168 uses data from the data warehouse 165. Examples of churn management processes for identifying valuable customers with a high likelihood of being lost are described more fully in FIGS. 2-6.

The ability to identify valuable customers with a high likelihood of being lost may be useful. Rather than treating all customers with a high likelihood-to-churn equally, the business enterprise can instead focus on retaining the most valuable customers that have a high likelihood-to-churn. This also may help the business enterprise direct resources to retaining the most profitable customers, which, in turn, may reduce, or even substantially reduce, the loss of revenue from customer attrition.

The data warehouse computer system 110 is capable of delivering and exchanging data with the transaction computer systems 120 and 130 through a wired or wireless communication pathway 176 and 178, respectively. The data warehouse computer system 110 also is able to communicate with the on-line client 115 that is connected to the computer system 110 through a communication pathway 182.

The data warehouse computer system 110, the transaction computer systems 120 and 130, and the on-line client 115 may be arranged to operate within or in concert with one or more other systems, such as, for example, one or more LANs ("Local Area Networks") and/or one or more WANs ("Wide Area Networks"). The on-line client 115 may be a general-purpose computer that is capable of operating as a client of the application program (e.g., a desktop personal computer, a workstation, or a laptop computer-running an application program), or a more special-purpose computer (e.g., a device specifically programmed to operate as a client of a particular application program). The on-line client 115 uses communication pathway 182 to communicate with the data warehouse computer system 110. For brevity, FIG. 1 illustrates only a single on-line client 115 for system 100.

In some implementations, the data warehouse computer system 110 also may include a data mining mart that temporarily stores data from the data warehouse 165 for use by the churn management process. In such a case, data is extracted from the data warehouse 165 and stored in the data mining mart.

Figure 2:
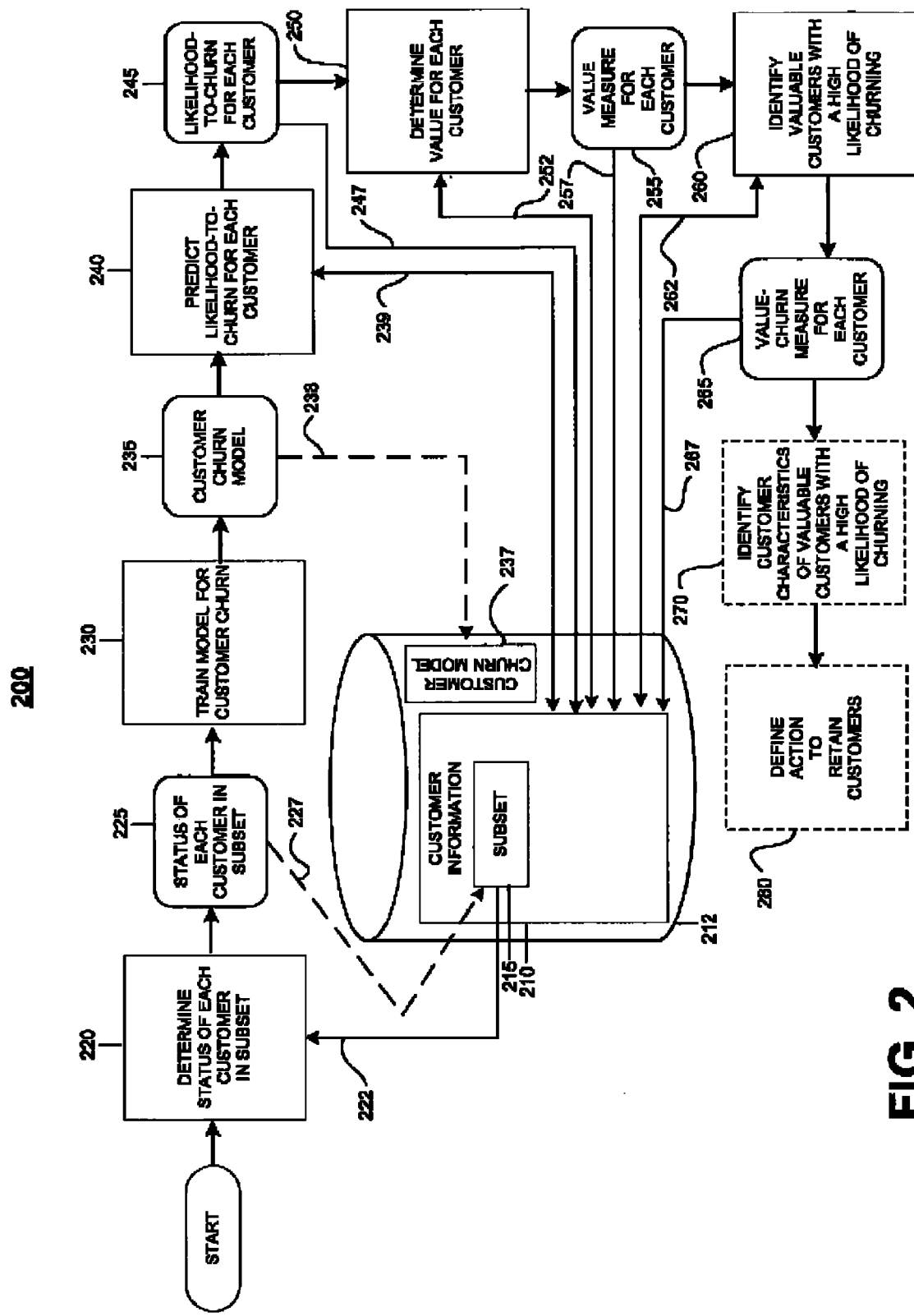
FIG. 2 is a block diagram illustrating a churn management process that identifies valuable customers that have a high likelihood-to-churn.

FIG. 2 illustrates a process 200 for identifying valuable customers with a high likelihood of being lost. The process 200 may be referred to as a churn management process. The churn management process 200 may be performed by a processor on a computing system, such as data warehouse computer system 110 of FIG. 1. The churn management processor is directed by a method, script, or other type of computer program that includes executable instructions for performing the churn management process 200. An example of such a collection of executable instructions is the churn management process 168 of FIG. 1.

The churn management process 200 uses customer information 210 from a persistent data store 212. The customer information 210 may be an implementation of customer information 162 extracted from the transaction computer system 120 and stored in the data warehouse 165, as described in FIG. 1. The customer information 210 also includes information relating to how valuable the customer is to the business enterprise. The value of each customer may be measured based on the contribution of the customer to the profitability to the business enterprise. The value of each customer also may be measured in another way, such as the number of referrals made by the customer or the length of time that the customer has had a relationship with the business enterprise.

A system administrator, a business analyst, or another type of user manually initiates the churn management process 200. In general, a subset of customer information is analyzed to determine a customer churn management model that can be applied to the customer information to calculate a likelihood-to-churn for each customer. The analysis of the subset of customer information to produce a customer churn model may be referred to as training a model for customer churn. The use of the customer churn model to calculate a likelihood-to-churn for each customer may be referred to as a prediction analysis. In addition to the determination of a likelihood-to-churn, a measure of the value of each customer is determined, and the valuable customers with a high likelihood-to-churn are identified.

More specifically, the churn management processor analyzes customer information for a subset 215 of records in customer information 210 to determine whether each customer in the subset 215 is an active customer or a lost customer who has churned (step 220). Such a determination may be referred to as understanding the status of a customer—that is, determining whether a customer has an active status or has a lost status. The churn management processor accesses the subset 215 of customer records as indicated by data flow 222.

The determination of the status of a customer may be made in different ways. For example, the determination may be based on whether a customer has made a purchase from the business enterprise within a predetermined time period, has contacted the business enterprise within a predetermined time period, or otherwise has related with the business enterprise within a predetermined time period. The determination of the status of a customer also may be made based on several criteria. Each of the criterion also may be associated with an order of priority relative to another criterion. Each of the criterion may be made up of one or more conditions. One example is a criteria that identifies conditions that a customer must meet to have an active status. In this example, the active status is based on a customer fulfilling either of two conditions; otherwise, the customer is considered to be a lost customer. The first condition is that a customer is an active customer when the customer has made a purchase from the business enterprise within the past three months. The second condition is that a customer is an active customer when the customer has had at least one contact with the business enterprise in the past five months. When the customer has not fulfilled either of those conditions, the customer is given a lost status.

The active status of a customer also may be indicated based on multiple conditions. For example, a customer is an active customer when the customer has made a purchase within the past six months and maintains a particular type of membership relationship with the business enterprise. A membership relationship may based on, for example, certain requirements that the customer fulfills (such as paying a fee, being a customer of the business enterprise for a particular amount of time, or making a predetermined amount of purchases from the business enterprise). For example, a customer who has flown a 100,000 miles on a particular commercial air carrier may be identified as having a membership relationship of a certain type (such as a gold club member) with the commercial air carrier.

It may be useful to permit a user to identify the criteria to be used to determine whether a customer is active or lost. The user may identify the criteria by defining several conditions, indicating a priority of each condition relative to other conditions, indicating a Boolean operator (such as "or," "and," and "not") to connect two conditions, and using if/else constructions to organize a process flow to be followed in executing the conditions. The user may identify the criteria, for example, by using a user interface to interactively define the criteria or may identify the criteria programmatically by developing a computer script or another type of computer program that defines the criteria.

The churn management processor then may receive, either programmatically or from a user interface, customer status criteria that is used to determine the status of each customer represented in a subset of customer information as an active customer or a customer who has been lost. The churn management processor applies the received customer status criteria to each customer record in the subset 215 to determine a status for each customer record. The result 225 is the status of each customer in the subset, which may be stored in the subset 215 of records of customer information, as indicated by data flow 227.

FIG. 3 shows one example of results 300 that may be determined about the status of each customer subset (step 220 in FIG. 2). The results 300 may be stored in a relational database system that logically organizes data into a database table. The database table arranges data associated with an entity (here, a customer) in a series of columns 310-315 and rows 320-324. Each column 310, 311, 312, 313, 314 or 315 describes an attribute of the customer for which data is being stored. Each row 320, 321, 322, 323 or 324 represents a collection of attribute values for a particular customer number by a customer identifier ("ID") 310.

The attribute 311 represents the relative time period in which the customer made the customer's most recent (or last) purchase. The time period for the last-purchase attribute 311 indicates the month in which the last purchase occurred as compared with the present month. For example, the last-purchase attribute 331 for the customer represented in row 321 is "Present Month—1," which indicates that the last purchase made by that customer occurred in the month immediately prior to the present month. Similarly, the last-purchase attribute 332 for the customer represented in row 323 is "Present Month—5" which represents that the last purchase made by that customer occurred five months prior to the present month.

The attributes 312, 313 and 314 represent types of demographic information for each customer. Specifically, the attribute 312 represents the customer's age in years, the attribute 313 indicates a category (low, medium or high) associated with the customer's income level, and the attribute 314 indicates the size of the customer's household (that is, the number of family members that reside with the customer).

The attribute 315 indicates the status for each customer 320, 321, 322, 323 and 324. The status has one of the values "Active" or "Lost." The status attribute 315 may be created by a churn management process, such as step 225 of the churn management process 200 described in FIG. 2.

Referring to FIG. 2, the churn management processor trains, based on the subset 215 that includes a status for each customer, a statistical model to identify customer churn patterns (step 230). As is conventional, after the status of a subset of customers has been determined, the churn management processor analyzes attributes of customer information for customers with a lost status to identify attributes that are common to customers that have been lost. This may be referred to as training a model using customer profiles or another type of collection of historical data about customers. Additionally or alternatively, the churn management processor may analyze attributes of customer information for customers with an active status to identify attributes that are common to customers that have been retained. The common attributes detected may be organized into a customer churn pattern that identifies a likelihood that a particular customer will be lost or will churn. This may be referred to as the likelihood-to-churn of a customer. The likelihood-to-churn represents the probability that a particular customer will be lost in a predetermined future time period. The likelihood-to-churn can be represented as a value between zero and one that represents the probability that the customer will be lost during the predetermined time period. The customer churn pattern may be referred to as a customer likelihood-to-churn model.

In one example, a decision tree, or another type of data structure, may be created that includes rules for determining the likelihood-to-churn for a customer. The decision tree can then be applied to a customer record to determine a likelihood-to-churn for the customer, as described more fully below.

The result 235 is the customer churn model, which may be in the form of a decision tree. The customer churn model may be stored as the customer churn model 237 in persistent storage, as indicated by data flow 238.

The churn management processor applies the customer churn model to predict a likelihood-to-churn for each customer in customer information 210, as indicated by the data flow 239 (step 240). The application of the customer churn model results in a likelihood-to-churn value for each customer record, as indicated by result 245. In some implementations, the churn management processor determines a likelihood-to-churn only for customers other than the customers in the subset 215, for whom a status is determined in step 220.

The likelihood-to-churn value for each customer may be stored in customer information 210, as indicated by data flow 247. In some implementations, when a subsequent likelihood-to-churn value for a customer is determined, such as a likelihood-to-churn value for a customer that is determined in the following month, the likelihood-to-churn value from the previous churn management process may be replaced so that a customer has only one likelihood-to-churn value at any time. In contrast, some implementations may store the new likelihood-to-churn value each month, in addition to a previous value for the likelihood-to-churn, to develop a time-dependent prediction—that is, a new prediction for the same type of prediction is stored each time a churn management process is performed for a customer. The time-dependent prediction may help improve the accuracy of the customer churn model because the predicted values may be monitored over time and compared with actual customer behavior.

FIG. 4 shows the results 400 of predicting the likelihood-to-churn for some customer records, such as a portion of the result 245 from step 240 in FIG. 2. The results 400 may be stored in a relational database system that logically organizes data into a database table. The database table arranges data associated with a customer record in a series of columns 410-415 and rows 420-424. Each column 410, 411, 412, 413, 414 or 415 describes an attribute of the customer for which data is being stored. Each row 420, 421, 422, 423 or 424 represents a collection of attribute values for a particular customer number by a customer identifier ("ID") 410. By contrast to results 300 in FIG. 3 that illustrated the application of the status criteria to determine the status for customers in a subset of customer data, such as subset 215 in FIG. 2, the customers represented in results 400 are illustrative of the application of the customer churn model to all customer records, such as customer information 210 in FIG. 2. Thus, the values of the customer IDs in attribute 410 are not identical to the customer IDs shown in attribute 310 in FIG. 3.

The attribute 415 represents the likelihood-to-churn for each customer 420, 421, 422, 423 and 424. The likelihood-to-churn attribute 415 was created by a churn management process, such as step 240 of the churn management process 200 in FIG. 2.

Referring to FIG. 2, the churn management processor determines a value for each customer represented in the customer information (step 250). In some implementations, the churn management processor may determine a value only for customers other than customers in subset 215. A customer's value may be determined in different ways. Examples of the ways the value of a customer may be measured include the contribution of the customer to the profitability of the business enterprise, the number of referrals a customer or another type of business partner makes to the business enterprise, the duration of the customer's relationship with the business enterprise, or another measure of how valuable a customer is to the business enterprise.

The determination of a value measure for each customer is indicated by the result 255. The value measure for each customer may be stored in customer information 210, as indicated by data flow 257.

The churn management processor identifies valuable customers with a high likelihood of churning (step 260). This may be accomplished, for example, by determining a value-churn measure that takes into account both the value of the customer to the business enterprise and the likelihood the customer is to churn or be lost in the future. The value-churn measure may reflect the relative value and likelihood-to-churn of a customer as compared with other customers. A high value-churn measure may reflect a customer with a higher value and a higher likelihood-to-churn, whereas a low value-churn measure may reflect a customer with a lower value and a lower likelihood-to-churn.

In one example, a value-churn index may be a customer value index plus the likelihood-to-churn for a customer. Statistical techniques may be applied to normalize the customer value index such that the customer value index is a value between zero and one hundred. In another example, a customer-value statistical weight may be applied to the customer value index for a customer to calculate a weighted customer value index. A likelihood-to-churn statistical weight may be applied to the likelihood-to-churn for the customer to calculate a weighted likelihood-to-churn index. The likelihood-to-churn statistical weight can be the same as or different from the customer-value statistical weight. The weighted value-churn index is added with the weighted likelihood-to-churn for a weighted value-churn index for the customer. Statistical techniques may be applied to normalize the customer value index such that the customer value index is a value between zero and one hundred.

The identification of valuable customers with a high likelihood of churning results in a value-churn measure for each customer, as indicated by result 265. The value-churn measure for each customer may be stored in customer information 210, as indicated by data flow 267.

Optionally, the churn management processor may analyze customer information of valuable customers that are at-risk of churning to determine common characteristics or attributes (step 270). For example, demographic characteristics, such as the age, income, and household size, that are common to some or all of the valuable customers that are at-risk of churning may be analyzed. Examples of the types of analyses that may be performed include classification and clustering. Customers may be classified based on pre-established demographic characteristics of customers. Similarly, statistical techniques may be used to cluster customers based on multiple demographic characteristics. The identified clusters of customers may be used for analysis of common characteristics, as may the identified classifications of customers.

In addition, a customer survey may be used to identify characteristics about valuable customers with a high likelihood-to-churn. For example, a customer survey may be used to understand the factors that lead to customer satisfaction and customer loyalty.

The business enterprise then may use the common characteristics to help develop marketing programs, promotional campaigns or take other types of action to help retain valuable customers that are at-risk for churning (step 280).

FIG. 5 illustrates an example of a sub-process to identify valuable customers in a churn management process. The customer value determination sub-process 500 may be performed by a processor on a computing system, such as data warehouse computer system 110 of FIG. 1. The churn management processor is directed by a method, script, or other type of computer program that includes executable instructions for performing the customer value determination sub-process 500. An example of such a collection of executable instructions may be a portion of the executable instructions within the churn management process 168 of FIG. 1. In contrast to the determination of customer value (step 250 in FIG. 2), the customer value determination sub-process 500 uses two measures of customer value to create a composite customer value index. In this example, the two measures of customer value are measures related to a customer's profitability. The profitability data used in the determination of customer value may be available, for example, from a financial management system, an enterprise resource planning system, or another type of accounting system.

The churn management processor determines customer profitability based on product cost (step 510). The product-cost profitability measure for a customer may be determined by computing the customer's net sales (that is, gross sales minus sales deductions), and subtracting product costs from the net sales result. The result is a product-cost profitability measure for the customer.

The churn management processor also determines customer profitability based on sales cost (step 520). The sales-cost profitability measure subtracts, from the product-cost profitability measure, additional costs associated with the customer. Specifically, the additional costs subtracted are costs related to selling the product or service to the customer. The costs related to selling the product or service to the customer may be referred to as sales cost. Sales costs may be direct sales costs such that the sales costs are directly to making a particular sale to the customer. Examples of direct sales costs include marketing costs and promotional costs, customer-related order costs, and customer-related shipment costs. Sales costs also may be indirect sales costs such that the sales costs are not directly related to making a particular sale to the customer. Examples of indirect sales costs include costs for customer visits, customer support, and customer care. The indirect sales costs may be related to costs incurred before or after a particular sale to the customer.

These examples of customer value measures are merely illustrative. A measure of customer value may be determined in many different ways. For example, some implementations may use a product-cost profitability measure and a sales-cost profitability measure that includes only direct sales costs (and not indirect sales cost). Some implementations may use measures other than profitability to determine customer value. Some implementations may use a profitability measure (such as a sales cost profitability measure) and a value measure based on the duration of the relationship between the business enterprise and the customer.

The churn management processor then determines, using the product-cost profitability measure and the sales-cost profitability measure, a composite-customer-value index (step 530). The composite-customer-value index represents the value of the customer based on the amount of profit the customer generates for the business enterprise.

In one example of a composite-customer-value index, the composite customer value is determined by summing a product-cost profitability measure, a sales-cost profitability measure, and the result of dividing the sales-cost profitability measure by the product-cost profitability measure. This technique may provide a more accurate composite customer value index, as described more fully in FIG. 6.

In another example, statistical weights may be associated with each of the product-cost profitability measure, the sales-cost profitability measure, and the result of dividing the sales-cost profitability measure by the product-cost profitability measure. The statistical weights are applied to each component (that is, the product-cost profitability measure, the sales-cost profitability measure, and the result of dividing the sales-cost profitability measure by the product-cost profitability measure) and then the weighted components are summed. Other statistical techniques also may be applied, such as normalizing the composite-customer-value index so that the value of the index is between zero and one hundred.

The use of statistical weights may be useful to help improve the accuracy of the composite-customer-value index. The accuracy of the composite-customer-value index may most accurately reflect the value of a customer when a statistical weight of 0.4 is applied to the product-cost profitability measure, a statistical weight of 0.4 is applied to the sales-cost profitability measure, and a statistical weight of 0.2 is applied to the result of dividing the sales-cost profitability measure by the product-cost profitability measure.

It may be advantageous to permit a user to be able to identify or otherwise configure statistical weight parameters for the composite-customer-value index. For example, a user then would be able to adjust the statistical weights used to reflect the experience of the customer and/or product cycle variations of the industry of the business enterprise.

FIG. 6 illustrates one example of results 600 of a customer value determination sub-process, such as the customer value determination sub-process 500 in FIG. 5. The results 600 are stored in a relational database system that logically organizes data into a database table. The database table arranges data associated with a customer record in a series of columns 610-615 and rows 620-624. Each column 610, 611, 612, 613, 614 or 615 describes an attribute of the customer for which data is being stored. Each row 620, 621, 622, 623 or 624 represents a collection of attribute values for a particular customer number by a customer identifier ("ID") 610.

The attribute 611 represents the customer profitability based on product cost for each customer 620, 621, 622, 623 and 624. The product-cost profitability attribute 611 was created by a portion of a churn management process, such as step 510 of the customer value determination sub-process 500 in FIG. 5.

The attribute 612 represents the customer profitability based on sales cost for each customer 620, 621, 622, 623 and 624. The sales-cost profitability attribute 612 was created by a portion of a churn management process, such as step 520 of the customer value determination sub-process 500 in FIG. 5.

The attribute 613 represents the relative rank (or order) of each customer 620, 621, 622, 623 and 624 based on the customer's profitability based on product cost for each. The highest customer profitability is given the highest rank. Similarly, the attribute 614 represents the relative rank, from highest to lowest, of each customer 620, 621, 622, 623 and 624 based on the customer's profitability based on sales cost for each. The attribute 615 represents the relative rank (or order) of each customer 620, 621, 622, 623 and 624 based on the customer's composite customer value index (not shown).

The technique of using multiple measures of customer value (here, customer profitability) may provide a more accurate composite-customer-value index because direct and indirect sales costs associated with a customer are given additional weight relative to the profitability measure based on product cost alone. As shown by the customer represented by row 622, that particular customer had the lowest product cost profitability, as illustrated by attribute 630, in comparison to the product cost profitability of the other four customers. When sales costs also were taken into consideration, the customer represented by row 622 did not have the lowest profitability measure, as illustrated by attribute 632. More specifically, out of the five customers represented by rows 620-624, the customer represented by row 622 ranked fourth, not last as the customer had when the product cost profitability alone was considered (as described above). Using the composite-customer-value index in which the sales costs were given additional weight relative to the product costs, results in yet a different ranking for the customer represented by row 622, as illustrated by attribute 634. More specifically, that particular customer was the third most profitable customer using the composite-customer-value index as a measure of customer profitability.

Figure 7:
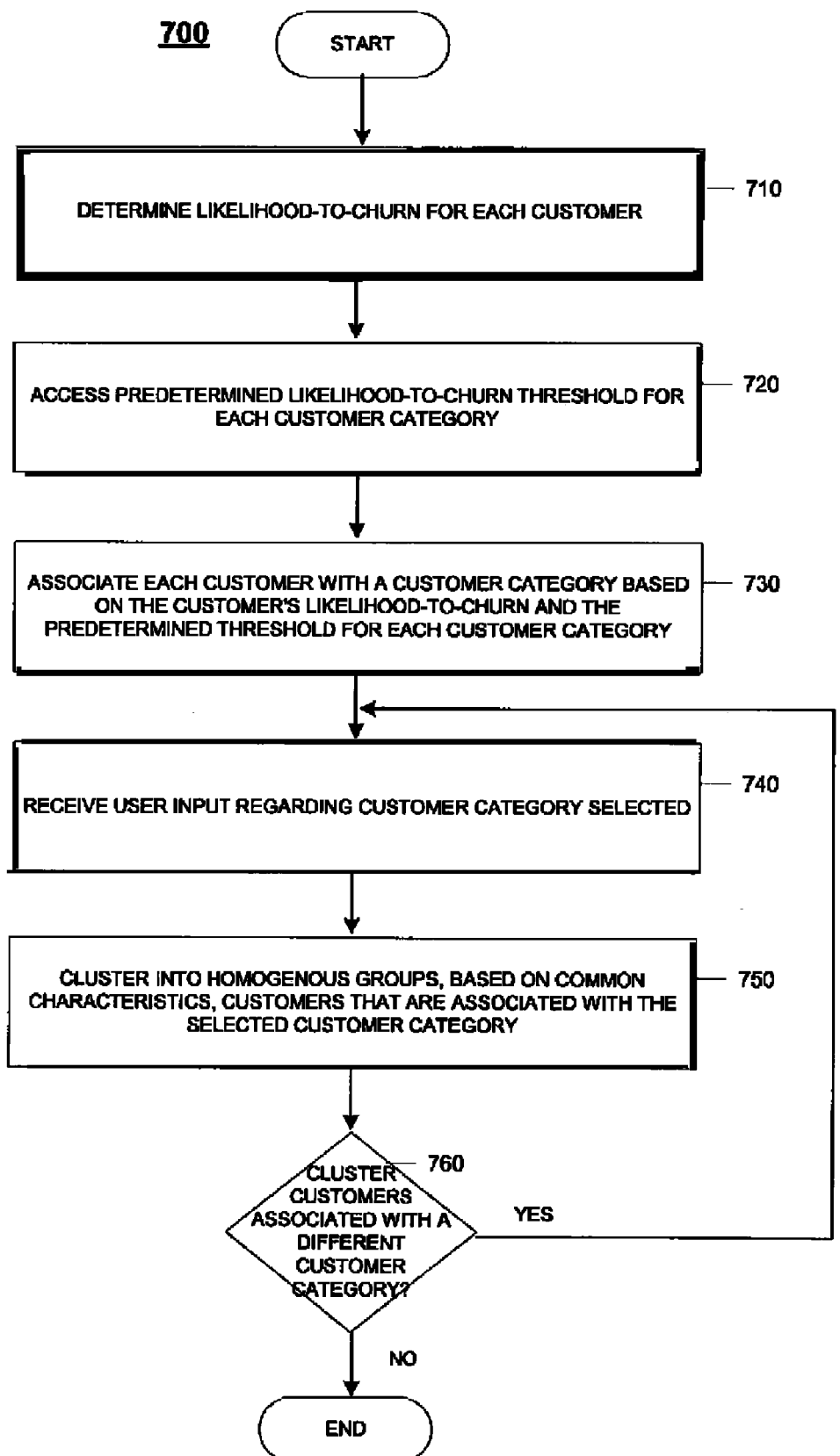
FIG. 7 is a flow chart of a process for identifying customers with a high likelihood of being lost and segmenting, based on common customer characteristics, customers into different groups of customers.

FIG. 7 illustrates a process 700 for identifying customers with a high likelihood of being lost and segmenting, based on common customer characteristics, customers into different groups of customers. The process 700 may be referred to as a categorical churn management process. The categorical churn management process 700 groups customers using a predetermined category definition and also clusters the customers that are in one of the predefined customer categories into smaller, more homogenous groups of customers based on shared customer characteristics.

The churn management process 700 may be performed by a processor on a computing system, such as data warehouse computer system 110 of FIG. 1. The churn management processor is directed by a method, script, or other type of computer program that includes executable instructions for performing the churn management process 700. An example of such a collection of executable instructions is the churn management process 168 of FIG. 1. The churn management process 700 uses customer information, such as an implementation of customer information 162 extracted from the transaction computer system 120 and stored in the data warehouse 165, as described in FIG. 1.

A system administrator, a business analyst, or another type of user manually initiates the churn management process 700. In general, a likelihood-to-churn for each customer is determined. Then, based on a customer's likelihood-to-churn, each customer is associated with a customer category. Information about the customers associated with a particular customer category is analyzed to organize the customers into smaller groups of customers that share characteristics. Each of the customer groups also may be referred to as a customer cluster.

More specifically, the churn management processor determines the likelihood-to-churn for each customer (step 710). This may be accomplished, for example, by performing steps 220-240 of the churn management process 200 in FIG. 2. Another example of how the likelihood-to-churn may be determined is by performing steps 220-270 of the churn management process 200 in FIG. 2 to identify the most valuable customers that have a high likelihood-to-churn. The examples of how the likelihood-to-churn may be determined are illustrative and step 710 is not meant to be limited to the churn management process 200 of FIG. 2.

The churn management processor accesses predetermined likelihood-to-churn thresholds for each of several customer categories (step 720). The likelihood-to-churn thresholds are used to categorize each customer based on the customer's likelihood-to-churn. For example, a business analyst or another type of user may have previously defined criteria to use in categorizing each customer based on the customer's likelihood-to-churn. In one example, the user may have defined a category of customers to include each customer with a likelihood-to-churn of more than 0.8 as a category "A" of customers that have a high likelihood-to-churn. The user may have defined another category of customers to include each customer with a likelihood-to-churn of 0.5 to 0.8 as a category "B" of customers that have a medium likelihood-to-churn. The user may have defined yet another category of customers to include each customer with a likelihood-to-churn of less than 0.5 as a category "C" of customers that have a low likelihood-to-churn. The churn management processor may access the customer category definitions as defined by the user and stored in the churn management system, such as system 100 in FIG. 1.

In some implementations, a customer category may be defined using customer characteristics in addition to a customer's likelihood-to-churn. For example, a customer may be categorized into one of several customer categories based on a combination of the customer's likelihood-to-churn and the customer's value to the business enterprise, as described previously.

The churn management processor associates each customer with a customer category based on the customer's likelihood-to-churn and the predetermined threshold for each customer category (step 730). For example, the churn management processor may associate a customer with a likelihood-to-churn of 0.81 with the customer category of "A," a customer with a likelihood-to-churn of 0.60 with the customer category of "B," and customer with a likelihood-to-churn of 0.45 with the customer category of "C," based on the customer category definitions described above in step 720.

The churn management processor receives user input regarding a customer category selected (step 740). This may be accomplished, for example, when the user identifies one of the particular customer categories defined in step 720. Often the user identifies the customer category with a high likelihood-to-churn as the customer category to be used with regard to clustering the customers that are associated with that customer category, as described more fully below in step 750. In some implementations, a user may identify more than one customer category. For example, a user may identify both a high likelihood-to-churn category and a medium likelihood-to-churn category to be used for organizing the customers into smaller, more homogenous groups or clusters.

The churn management processor then organizes, based on common characteristics, the customers that are associated with the selected customer category into more homogenous groups (step 750). The process of organizing the customers may be referred to as clustering the customers, and the more homogenous groups that result from the organizing may be referred to as customer clusters. The clustering of customers may be accomplished, for example, using conventional statistical techniques, such as cluster analysis, factor analysis and multivariate analysis of variance. The characteristics used by the churn management processor used to cluster customers may be predetermined by a user or alternatively may be identified automatically during the clustering process 700.

Whether each customer associated with the customer category being clustered is required to be in at least one cluster, can only be in one cluster, or may be in more than one cluster may vary in different implementations. For example, in some implementations, all customers associated with a particular category must be organized into one, and only one, of several customer clusters. Alternatively, some implementations may not require each customer associated with a particular category to be organized into at least one of the customer clusters. Some implementations may permit a customer to be associated with more than one cluster. In some implementations, whether a customer is required to be associated with a customer cluster may be configurable by a user or a program.

When customers associated with another customer category are to be clustered (step 760), the churn management processor proceeds by continuing with step 740. Otherwise, the churn management process 700 ends.

The churn management process 700 may be particularly useful in defining multiple homogenous groups of customers, each group of which can be targeted for a different promotional campaign that is focused on the shared characteristics of the customers in the customer group. The churn management processor may group customers twice to identify a smaller, more homogenous group of customers so that, for example, a more targeted promotional campaign may be directed toward the smaller group of customers. The churn management processor first, in step 730, categorizes each customer based on the customer's likelihood-to-churn. Then the churn management processor, in step 750, clusters the customers who are associated with one likelihood-to-churn category. The use of such a multiple-criteria process to organize customers may result in groups of customers being identified that are more homogenous than the groups of customers defined using a conventional churn management process.

The ability to define a more homogenous group of customers may be useful. For each homogenous group of customers that is defined, a different promotional campaign may be developed and used on the customers of the group. Each of the promotional campaigns may be targeted to a particular cluster of customers. By doing so, each promotional campaign could be directed to a smaller number of customers that share a greater number of characteristics (as compared with a promotional campaign that is directed to all of the customers that have been identified based on a single grouping, such as all of the customers identified as having a high likelihood-to-churn in step 730).

Each promotional campaign developed using a multiple categorization process for churn management may be more effective and cost less than a promotional campaign that is targeted to all customers that have a high likelihood-to-churn. A promotional campaign developed using the results of the churn management process 700 is focused on common characteristics of customers in one of the customer clusters and may be more focused than a promotional campaign developed based on fewer common characteristics of all of the customers with a high likelihood-to-churn. Therefore, a promotional campaign developed using the results of the churn management process 700 may be more effective.

The cost of a promotional campaign often is related to the number of people to whom the promotional campaign is directed, and thus, the cost of each promotional campaign developed using the results of the churn management process 700 may be less than a promotional campaign developed using a conventional churn management process. The aggregate cost of all of the promotional campaigns directed to one of the customer clusters identified by the churn management process 700 also may be less than the cost of a promotional campaign that is developed using a conventional churn management process. This may be particularly true when a business enterprise does not direct a promotional campaign to all of the customers with a high likelihood-to-churn, such as may occur when some of the customers are not included in a customer cluster identified in the churn management process 700.

The categorical churn management process 700 associates each customer with a category based on the customer's likelihood-to-churn. Some implementations of a categorical churn management process 700 may use other criteria to categorize customers. For example, a customer may be categorized based on the level of customer satisfaction or customer loyalty, such as may be determined using various techniques (including a customer survey). In another example, a customer may be categorized based on the level of revenue generated or the number of purchases made by the customer within a particular period of time.

Figure 8:
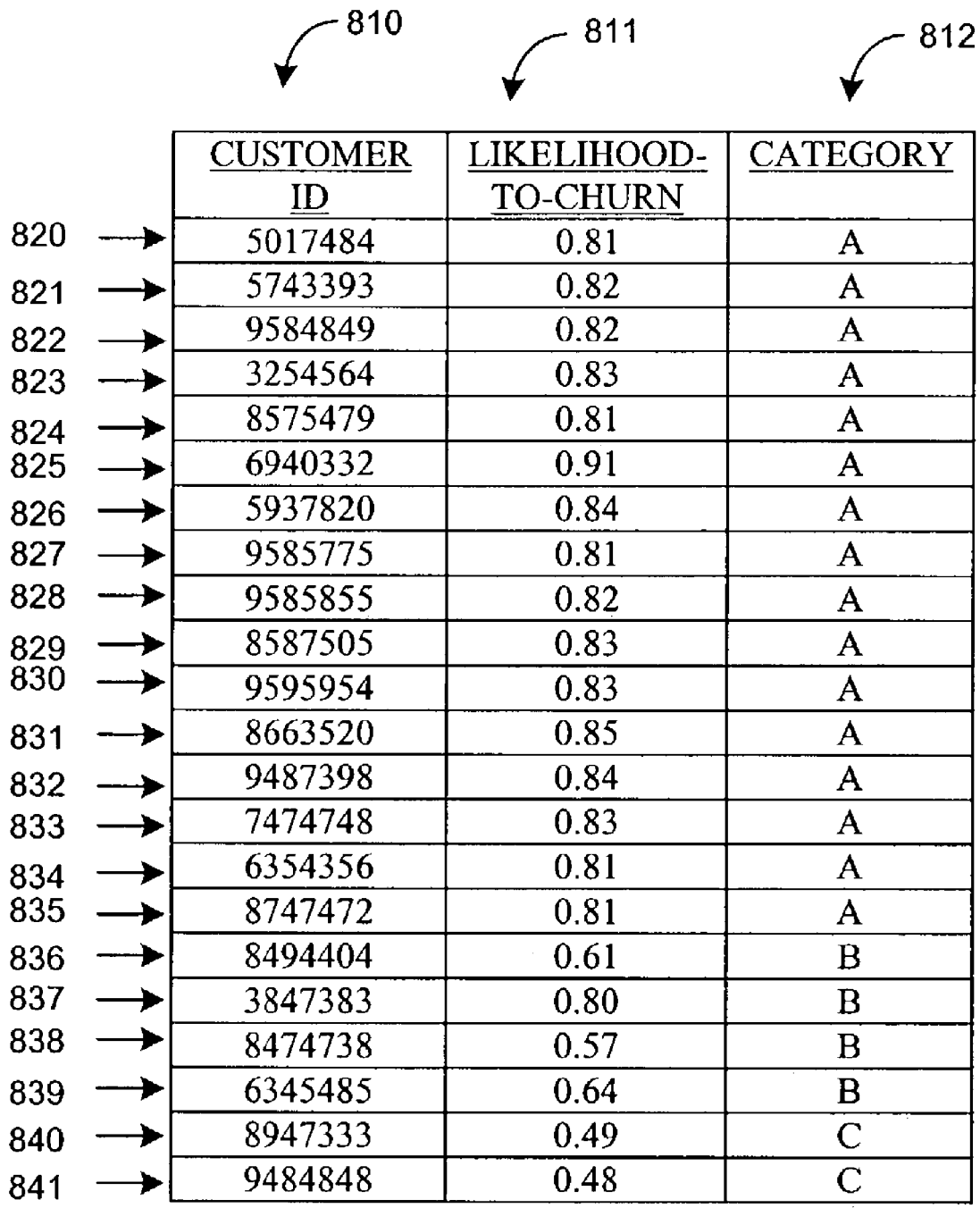
FIGS. 8 and 9 are block diagrams that show examples of results of aspects of the process depicted in FIG. 7

FIG. 8 shows one example of results 800 in which each customer is associated with a predetermined category (step 730 in FIG. 7). The results 800 may be stored in a relational database that logically organizes data into a database table. The database table arranges data associated with an entity (here, customer) in a series of columns 810-812 and rows 821-841. Each column 810, 811 or 812 describes an attribute of the customer for which data is being stored. Each row of rows 821-841 represents a collection of attribute values for a particular customer number by a customer identifier ("ID") 810.

The attribute 811 represents the likelihood-to-churn for the customer. The likelihood-to-churn may be referred to as a churn index. Each of the customers are categorized into a particular customer category based on the value of the customer's churn index. In other implementations, each of the customers may be categorized based on another type of churn index, such as, for example, a churn index that represents the customer's value and likelihood-to-churn, as described previously, or another type of customer characteristic (such as customer loyalty or customer satisfaction) by which each customer categorized.

The attribute 812 represents the category to which the customer has been associated. In this example, each customer is associated with one of the customer categories A, B or C. More specifically, each customer with a likelihood-to-churn of more than 0.8 as a category "A" of customers that have a high likelihood-to-churn; each customer with a likelihood-to-churn of 0.5 to 0.8 as a category "B" of customers that have a medium likelihood-to-churn; and each customer with a likelihood-to-churn of less than 0.5 as a category "C" of customers that have a low likelihood-to-churn.

The churn-index attribute 811 for the customer represented by row 820 is "0.81" and the category attribute 812 associated with the customer is "A," which indicates the customer has a high likelihood-to-churn. Similarly, customers represented by rows 821-835 also have a category attribute 812 of "A."

The churn-index attribute 811 for the customer represented by row 836 is "0.61" and the category attribute 812 associated with the customer is "B," which indicates the customer has a medium likelihood-to-churn. Similarly, customers represented by rows 837-839 also have a category attribute 812 of "B."

The churn-index attribute 811 for the customer represented by row 840 is "0.49" and the category attribute 812 associated with the customer is "C," which indicates the customer has a medium likelihood-to-churn. Similarly, the customer represented by row 841 also has a category attribute 812 of "C."

Figure 9:
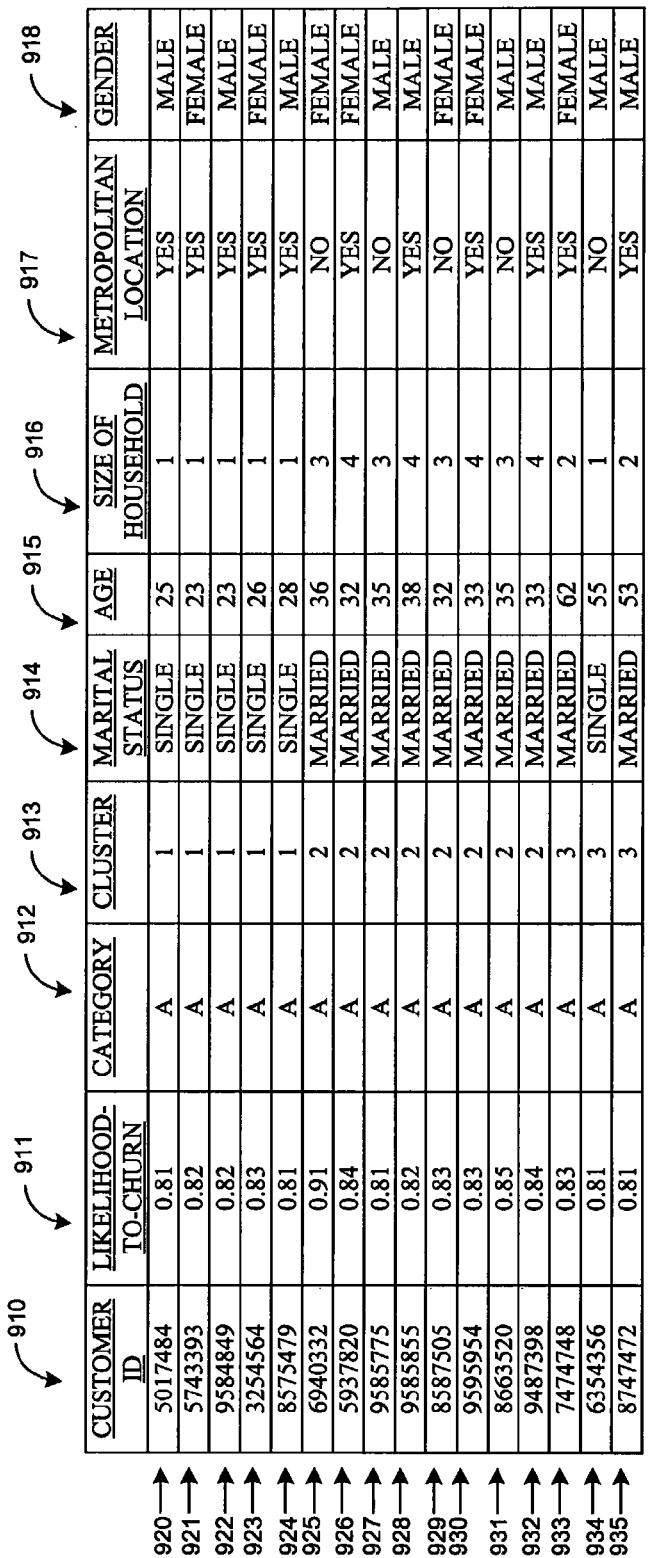

FIG. 9 depicts one example of results 900 of clustering customers with a high likelihood of churning into smaller, more homogenous segments. The results 900 may be a portion of the result from step 750 in FIG. 7. The results 900 may be stored in a relational database that logically organizes data into a database table. The database table arranges data associated with an entity (here, customer) in a series of columns 910-918 and rows 920-935. Each column of columns 910-918 describes an attribute of the customer for which data is being stored. Each row of rows 920-935 represents a collection of attribute values for a particular customer number by a customer identifier ("ID") 910.

The attribute 911 represents a likelihood-to-churn value, and the attribute 912 represents a category associated with the customer. The likelihood-to-churn attribute 911 may be the churn-index attribute 811 in FIG. 8, and the category attribute 912 may be the category attribute 912 also in FIG. 8.

The cluster attribute 913 indicates a cluster with which the customer represented by a row is associated. Three clusters of customers are shown in the results 900. Each cluster is identified by a cluster number "1," "2," or "3." Each customer is associated with one of the clusters based on a characteristic or characteristics of the customer.

Other customer attributes include a marital-status attribute 914, an age attribute 915, a size-of-household attribute 916, a location attribute 917 that indicates whether a customer lives in a metropolitan area, and a gender attribute 918.

More specifically, a first cluster of customers is identified and includes each customer who has the following characteristics: has a marital status of single, is between the age of 21 and 30 years old, and who lives alone and in a metropolitan area. Each customer that is associated with the first cluster is identified by a cluster attribute 913 value of "1." A second cluster of customers is identified and includes each customer who has the following characteristics: has a marital status of married, is between the age of 30 and 40 years old, and lives in a household of more than two people. Each customer that is associated with the second cluster is identified by a cluster attribute 913 value of "2." A third cluster of customers is identified and includes each customer who is more than fifty years old. Each customer that is associated with the third cluster is identified by a cluster attribute 913 value of "3."

As illustrated by the cluster results 900, the attributes used to segment each customer into one cluster may be different from the attributes used to segment a customer into another cluster. For example, the third cluster uses the age attribute 915, whereas the first cluster and the second cluster each use attributes in addition to the age attribute 915.

The cluster attribute 913 for the customer represented by row 920 is "1," which indicates the customer fulfills the criteria for the first cluster. More specifically, the customer has a marital-status attribute 914 with a value of "single," an age attribute 915 with a value of "25," a size-of-household attribute 916 of "1," and a location attribute 917 of "yes" that indicates that the customer lives in a metropolitan area. As such, the customer represented by row 920 fulfills the criteria of the first cluster as defined as having a marital status of single, being between the age of 21 and 30 years old, and living alone and in a metropolitan area. Similarly, the customers represented by rows 921-924 also are associated with the first cluster as indicated by the cluster attribute 913 of "1" for those rows.

Turning to the second cluster of customers, the cluster attribute 913 for the customer represented by row 925 is "2," which indicates the customer fulfills the criteria for the second cluster. More specifically, the customer has a marital-status attribute 914 with a value of "married," an age attribute 915 with a value of "36," and a size-of-household attribute 916 of "three." As such, the customer represented by row 925 fulfills the criteria of the second cluster as defined as having a marital status of married, being between the age of 30 and 40 years old, and living a household of more than two people. The location attribute 917 and the gender attribute 918 are not relevant to the association of the customer with the second cluster. Similarly, the customers represented by rows 926-932 also are associated with the second cluster as indicated by the cluster attribute 913 of "2" for those rows.

Turning to the third cluster of customers, the cluster attribute 913 for the customer represented by row 934 is "3," which indicates the customer fulfills the criteria for the third cluster. More specifically, the customer has an age attribute 915 with a value of "62," which fulfills the criteria of the third cluster of being greater than age of 50 years old. The other characteristic attributes 914 and 916-918 are not relevant to the association of the customer with the third cluster. Similarly, the customers represented by rows 934 and 935 also are associated with the third cluster as indicated by the cluster attribute 913 of "3" for those rows.

In the example cluster results 900, each customer is associated with only one cluster. In some implementations, a customer may be associated with more than one cluster and/or may not be associated with any cluster.

Figure 10:
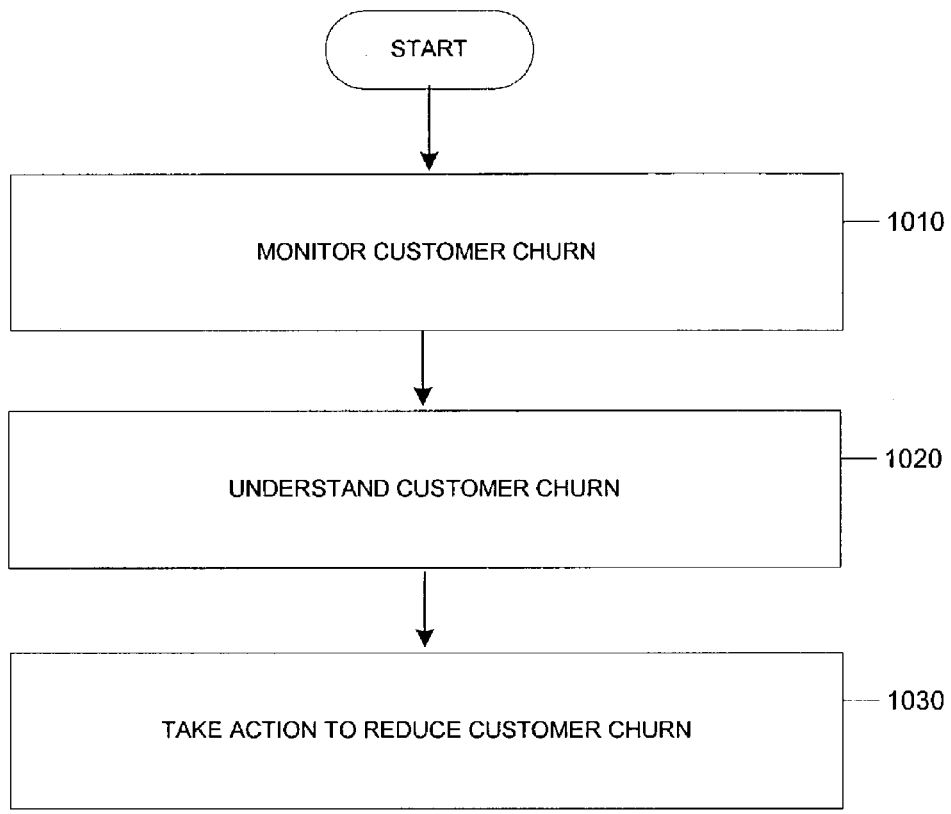
FIG. 10 is a flow chart of a process for managing customer churn.

FIG. 10 illustrates another example of a churn management process 1000. The churn management process 1000 may be used, for example, by an executive or a high-level manager of a business enterprise to help reduce customer churn. The churn management process 1000 may be a computer-implemented process in which a graphical user interface is used by the executive, the high-level manager or another type of user to manage customer churn.

The churn management process 1000 includes the steps of monitoring customer churn (step 1010), understanding customer churn (step 1020), and taking action to reduce customer churn (step 1030). Monitoring customer churn (step 1010) includes, for example, reviewing and analyzing information related to customer churn rates, lost profits, likelihood-to-churn rates, and likelihood-to-churn rates for important customers. A graphical user interface (GUI) for monitoring customer churn is described in FIGS. 11-13.

Understanding customer churn (step 1020) includes, for example, reviewing and analyzing information related to customer demographics, such as characteristics of customers who are likely to churn, are loyal or are valuable, or the geographic distribution of customers or a subset of customers. A GUI for understanding customer churn is described in FIGS. 14-16.

Taking action to reduce customer churn (step 1030) may include, for example, sending an electronic mail message, assigning a task related to reduce customer loss to be completed by an organizational unit or a person, or performing another type of action directed to reducing customer loss. In some cases, the action taken may be supported by a computer-implemented process. Examples of such computer-supported actions include sending an electronic mail message or recording a task assignment. In other cases, the action taken occurs using a manual process that is not supported by a computer-implemented process.

Figure 11:
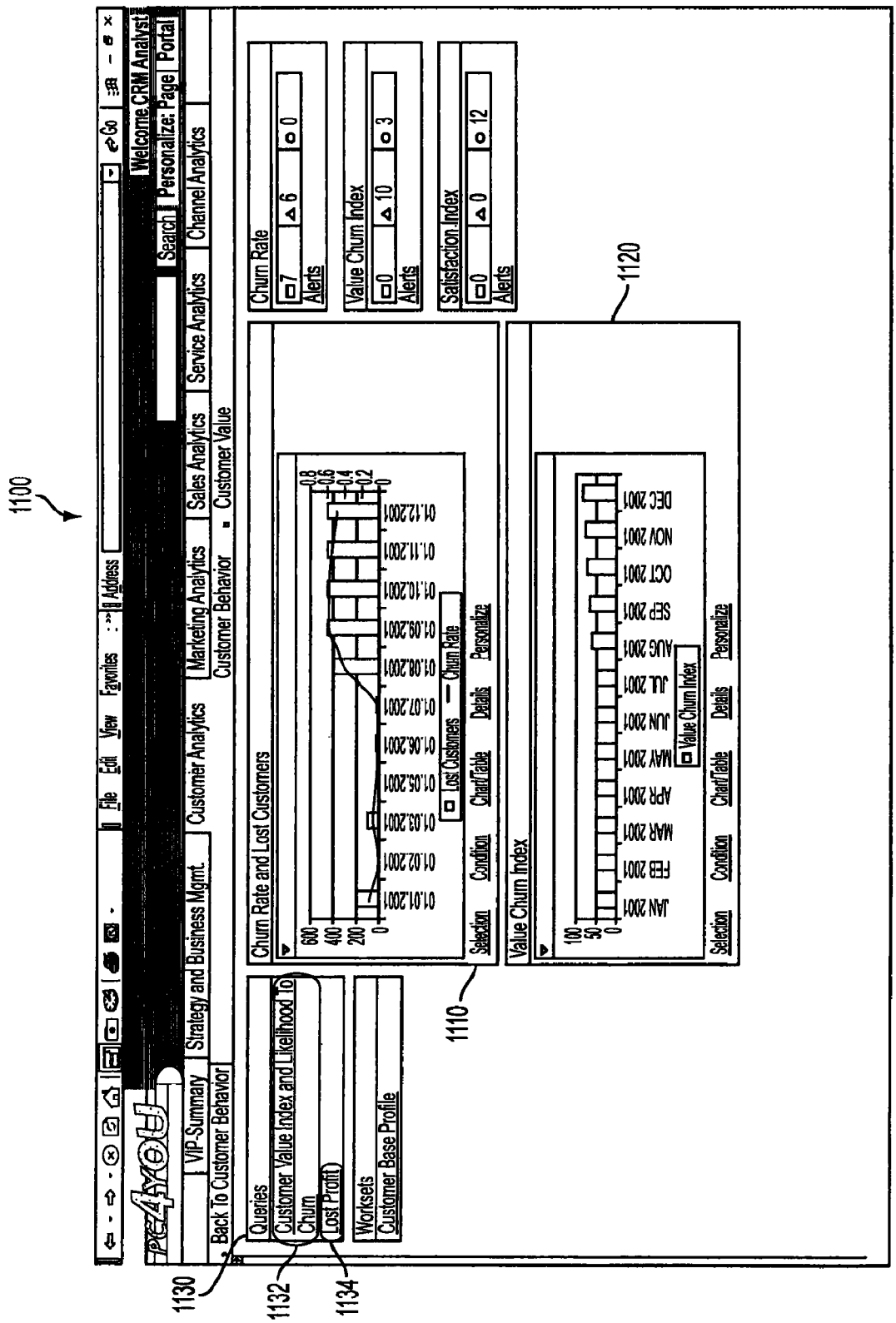
FIGS. 11-16 are screen captures that illustrate examples of an interface for managing customer churn.

FIG. 11 illustrates an example GUI 1100 for monitoring customer churn. The GUI 1100 may be included as part of the churn management process 168 in FIG. 1. In one implementation, GUI 1100 may be used to enable an executive or high-level manager of a business enterprise to display and use information related to customer churn that is generated by a business analyst or another type of user using an automated churn management process or other types of churn management tools. GUI 1100 is not meant to be limited to be used only by executives and high-level managers and may be used in other contexts.

The GUI 1100 represents an overview interface 1100 that may be used, for example, as part of an implementation of step 1010 the churn management process 1000. The overview interface 1100 typically includes one or more windows, such as, a churn-rate-and-lost-customers window 1110, a value-churn index window 1120, and a queries window 1130. The windows 1110-1130 may be arranged and sized by the user and may include features such as, for example, auto-generated scroll bars, tabs, drop-down menu selectors, and links to other windows or interfaces. Each of the windows 1110, 1120 or 1130 may be displayed individually or in combination with one or more of the other windows 1110, 1120 or 1130.

The churn-rate-and-lost-customers window 1110 displays a bar chart that shows the number of lost customers for each particular day within a time period. The window 1110 displays, along with the number of lost customers, the churn rate of customers for the business enterprise. The churn rate of customers of the business enterprise is displayed as a line graph.

The value-churn index window 1120 displays a bar chart that shows the value-churn index for each month of a year. The value-churn index may be the value-churn index described in step 260 in FIG. 2.

The queries window 1130 displays a list of other information that may be displayed using the overview interface 1100. More specifically, the queries window 1130 displays selectable links 1132 and 1134, each of which identifies another window that may be displayed.

Figure 12:
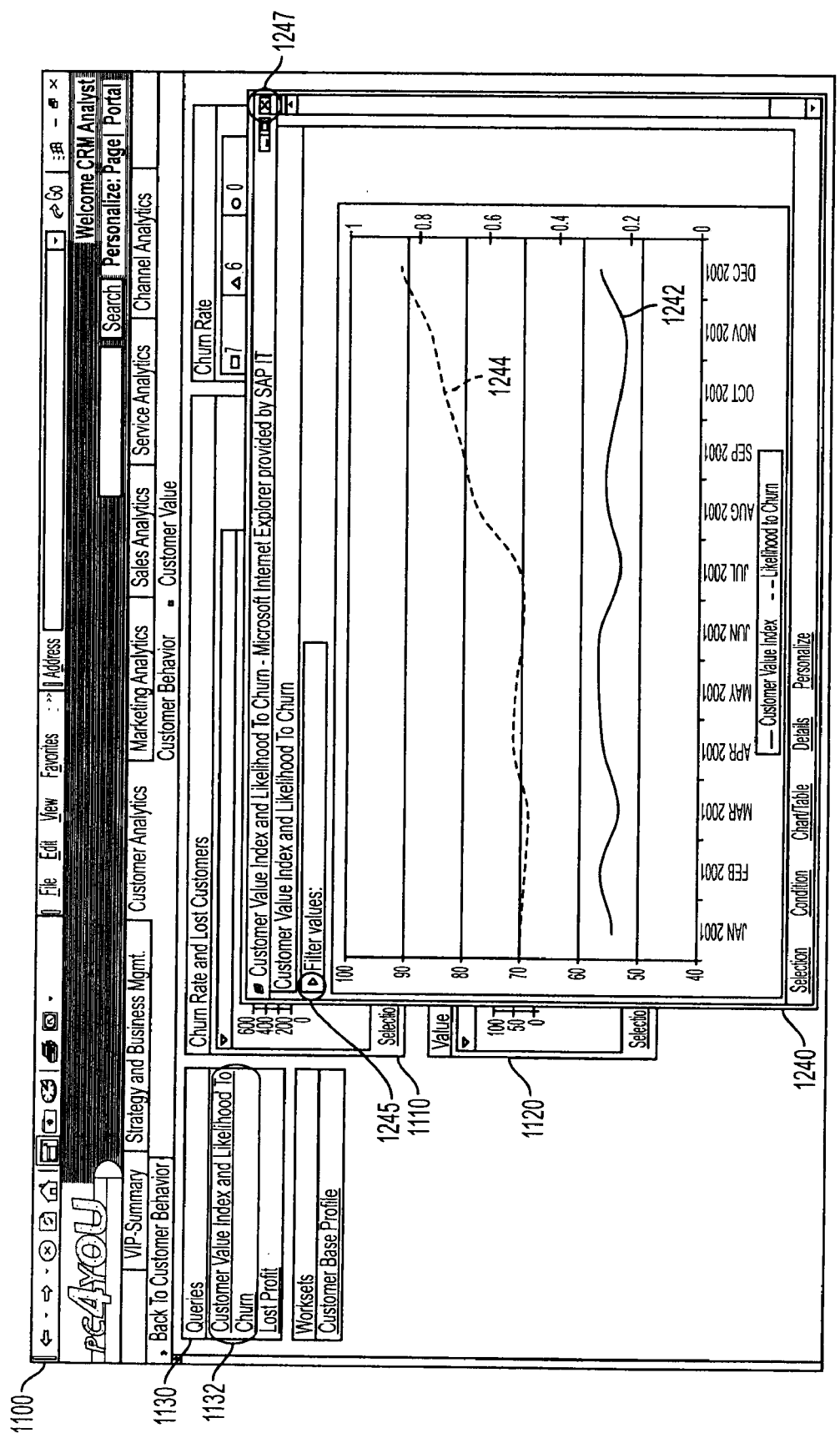

When a user selects, such as by using a pointing-device to click on, the link 1132, a customer-value-index-and-likelihood-to-churn window 1240 is displayed, as illustrated by FIG. 12. The customer-value-index-and-likelihood-to-churn window 1240 displays a line graph 1242 that displays the customer-value index for each month of a year and another line graph 1244 that displays the likelihood-to-churn for each month of a year. The window 1240 may be arranged and sized by the user and may include features such as, for example, auto-generated scroll bars, tabs, drop-down menu selectors, and links to other windows or interfaces. The window 1240 also includes a selector arrow 1245 that identifies the particular filter values used to segment the data used to create the particular profile or data set displayed in window 1240. In some implementations, a user may use the selector arrow 1245 to expand, select and minimize each of several filter value sets used to select various segments of likelihood-to-churn data to be displayed in window 1240. When finished using the window 1240, the user may select the close box 1247 to remove the window 1240 from the display.

Figure 13:
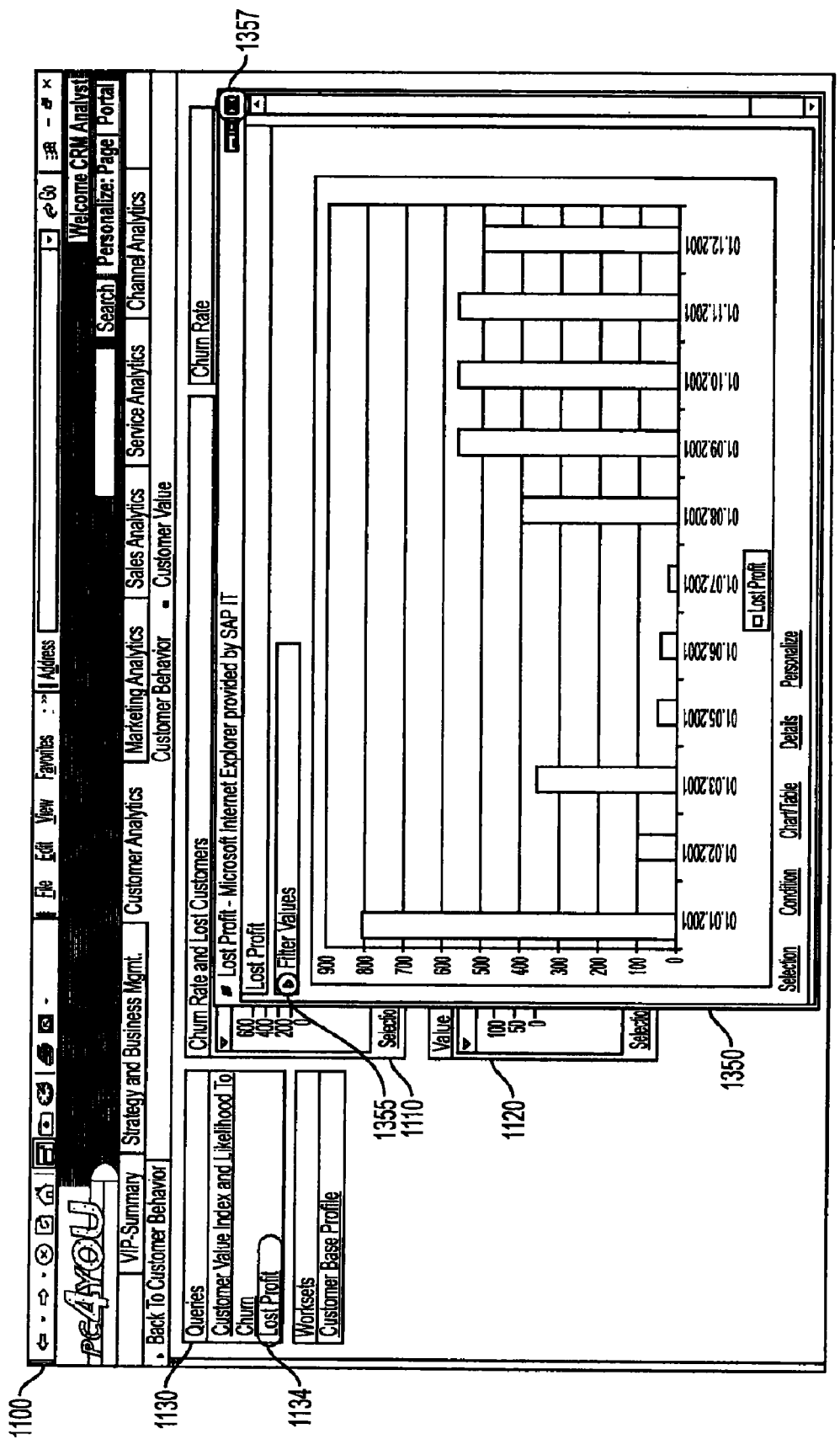

Referring again to FIG. 11, when a user selects, such as by using a pointing-device to click on, the link 1134, a lost-profit window 1350 is displayed, as illustrated by FIG. 13. The lost-profit window 1350 may be arranged and sized by the user and may include features such as, for example, auto-generated scroll bars, tabs, drop-down menu selectors, and links to other windows or interfaces. The window 1350 also includes a selector arrow 1355 that identifies the particular filter values used to segment the data used to create the particular profile or data set displayed in the window 1350. In some implementations, a user may use the selector arrow 1355 to expand, select and minimize each of several filter value sets used to select various segments of lost-profit data to be displayed in window 1350. When finished using the window 1350, the user may select the close box 1357 to remove window 1350 from the display.

The overview interface 1100 enables a user to flexibly and dynamically display and use information related to customer churn. The display of customer churn information using the customer profile interface 1100 may facilitate or otherwise enable a user in understanding customer churn.

Figure 14:
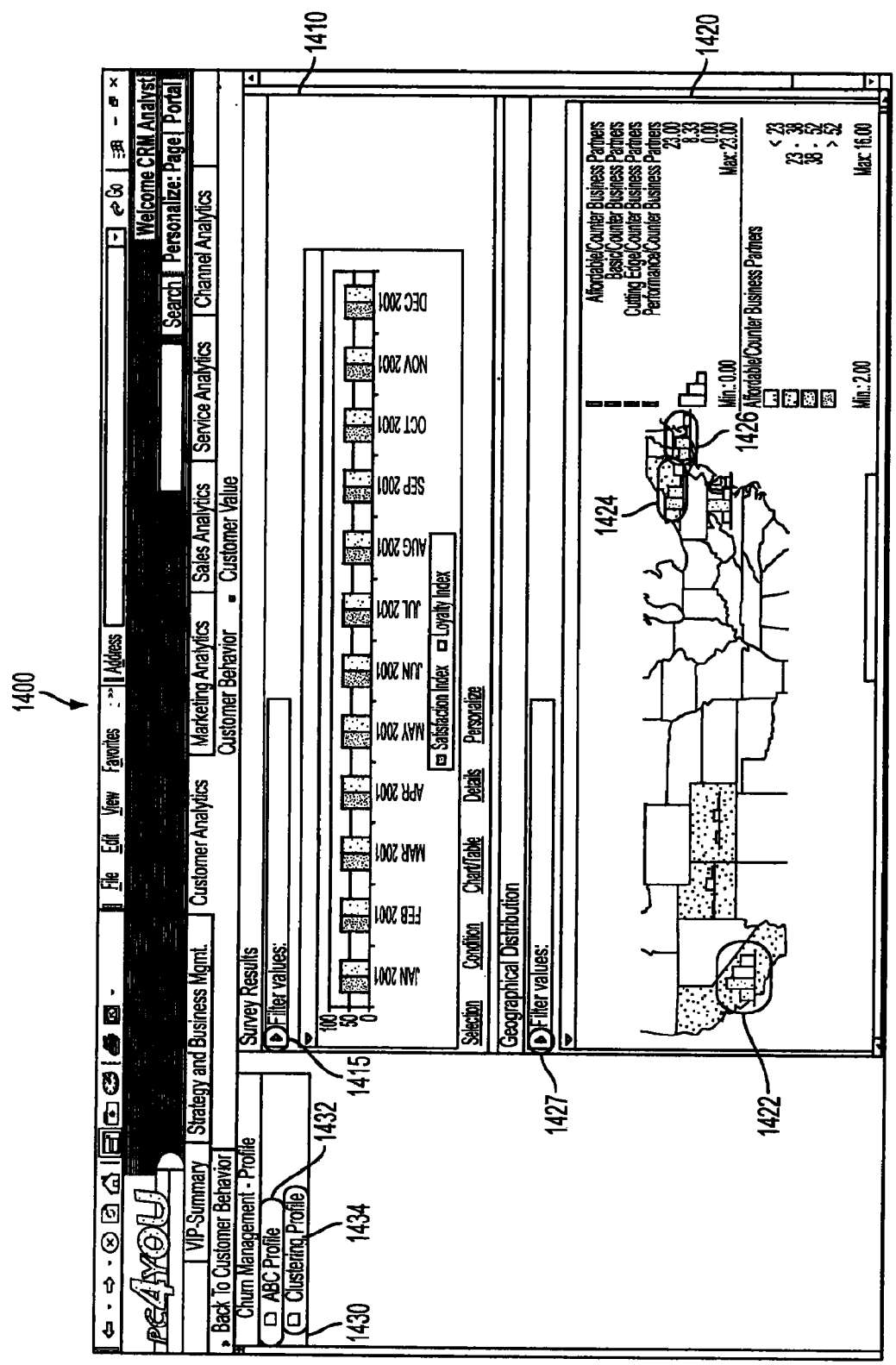

FIG. 14 illustrates an example GUI 1400 for understanding customer churn. The GUI 1400 may be included as part of the churn management process 168 in FIG. 1. In one implementation, GUI 1400 may be used to enable an executive or high-level manager of a business enterprise to display and use information related to customer churn that is generated by a business analyst or another type of user using an automated churn management process or other types of churn management tools. GUI 1400 is not meant to be limited to be used only by executives and high-level managers and may be used in other contexts.

The GUI 1400 represents a customer profile interface 1400 that may be used, for example, as part of an implementation of step 1020 the churn management process 1000. The customer profile interface 1400 typically includes one or more windows, such as, a survey-results window 1410, a geographical-distribution window 1420, and a profile window 1430. The windows 1410-1430 may be arranged and sized by the user and may include features such as, for example, auto-generated scroll bars, tabs, drop-down menu selectors, and links to other windows or interfaces. Each of the windows 1410, 1420 or 1430 may be displayed individually or in combination with one or more of the other windows 1410, 1420 or 1430.

The survey-results window 1410 displays a bar chart that shows a customer satisfaction index and a customer loyalty index for each month of a particular year. The customer satisfaction index and the customer loyalty index both may be based on the results from a customer survey in which customers respond to a series of questions regarding their satisfaction and the likelihood of purchasing products or services from the business enterprise. The survey-results window 1410 includes a selector arrow 1415 that identifies the filter values used to select the data displayed in the window 1410. In some implementations, a user may use the selector arrow 1415 to expand, select and minimize each of several filter values sets used to create multiple sets of survey results data that may be selectively displayed.

The geographical distribution window 1420 displays a representation of an area of a geographical location. Customer information that relates to a portion of the geography is shown on several portions of the displayed geographical area. For example, in window 1420, the forty-eight contiguous United States are shown. In the area that corresponds to the state of California, four bars 1422 are displayed. The height of each of the four bars 1422 represents the number of customers (which also may be referred to as business partners) that are located in the state of California and are members of one of four categories or clusters of customers. Similarly, the area displayed that corresponds to the state of New York includes four bars 1424 of which the height of each bar represents the number of customers that are associated with a particular category or a cluster, as does area that corresponds to the Commonwealth of Massachusetts 1426. The geographical-distribution window 1420 includes a selector arrow 1427 that identifies the filter values used to select the data displayed in the window 1420. In some implementations, a user may use the selector arrow 1427 to expand, select and minimize each of several filter values sets used to create multiple sets of geographical distribution data that may be selectively displayed.

The churn-management profile window 1430 displays a list of other information that may be displayed using the customer-profile interface 1400. More specifically, the churn-management profile window 1430 displays selectable links 1432 and 1434, each of which identifies another window that may be displayed.

Figure 15:
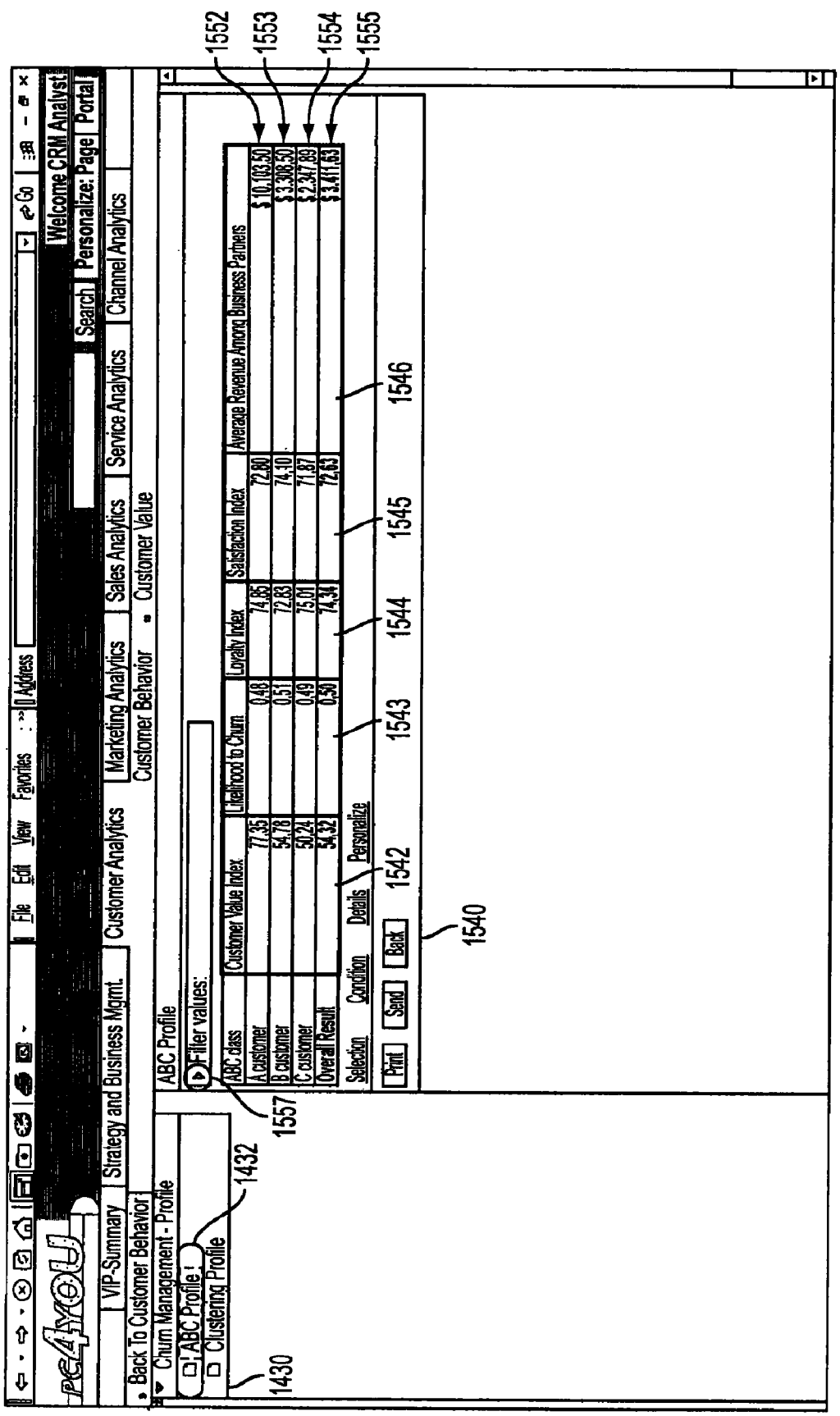

When a user selects, such as by using a pointing-device to click on, the link 1432, a customer-category-information window 1540 is displayed, as illustrated by FIG. 15. The customer-category-information window 1540 may be arranged and sized by the user and may include features such as, for example, auto-generated scroll bars, tabs, drop-down menu selectors, and links to other windows or interfaces. The customer-category-information window 1540 displays summary information related to each of several customer categories, such as a customer category described in steps 720 and 730 in FIG. 7. Here, the average customer-value attribute value 1542, the average likelihood-to-churn 1543, the average loyalty index 1544, the available satisfaction index 1545, and the average revenue 1546 for the customers in each customer category 1552, 1553 or 1554 is displayed. Average values for attributes 1542-1546 also are displayed for all customers, as indicated by row 1555.

The customer-category-information window 1540 includes a selector arrow 1557 that identifies the filter values used to select the data displayed in the window 1540. In some implementations, a user may use the selector arrow 1557 to expand, select and minimize each of several filter values sets used to create multiple sets of category distribution data that may be selectively displayed.

Figure 16:
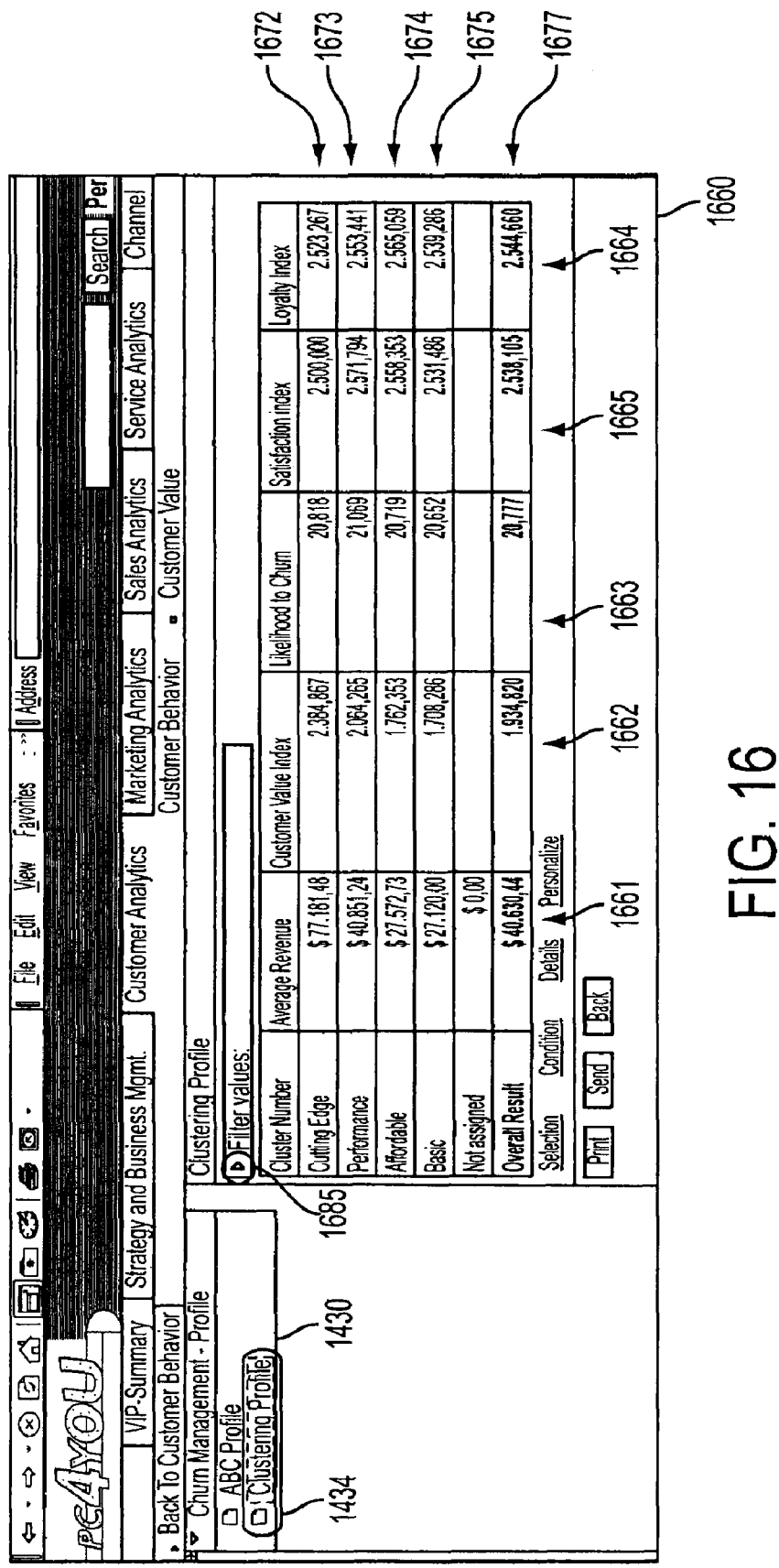

Referring again to FIG. 14, when a user selects, such as by using a pointing-device to click on, the link 1434, a clustering-profile window 1660 is displayed, as illustrated by FIG. 16. The clustering-profile window 1660 may be arranged and sized by the user and may include features such as, for example, auto-generated scroll bars, tabs, drop-down menu selectors, and links to other windows or interfaces. The clustering-profile window 1660 includes summary information related to each of several customer clusters, such as a customer cluster produced in step 750 of FIG. 7. More specifically, the clustering profile window 1660 includes the average revenue-value attribute 1661, the average customer-value attribute 1662, the likelihood-to-churn attribute 1663, the average loyalty index 1664, and the available satisfaction index attribute 1665 for the customers in each customer cluster 1672, 1673, 1674 or 1675 is displayed. Average values for attributes 1661-1665 also are displayed for all customers, as indicated by row 1677.

The clustering-profile window 1660 also includes a selector arrow 1685 that identifies the filter values used to identify the data set displayed in the window 1660. In some implementations, a user may use the selector arrow 1685 to expand, select and minimize each of several filter value sets used to create multiple sets of cluster data. When finished using the window 1660, the user may select a close button (not shown) to remove window 1650 from the display.

Referring again to FIG. 14, the customer-profile interface 1400 enables a user to flexibly and dynamically display and use information related to customer categories, clusters, and other types of customer profile information. The display of customer profile information using the customer-profile interface 1400 may facilitate or otherwise enable a user in understanding customer churn.

Figure 17:
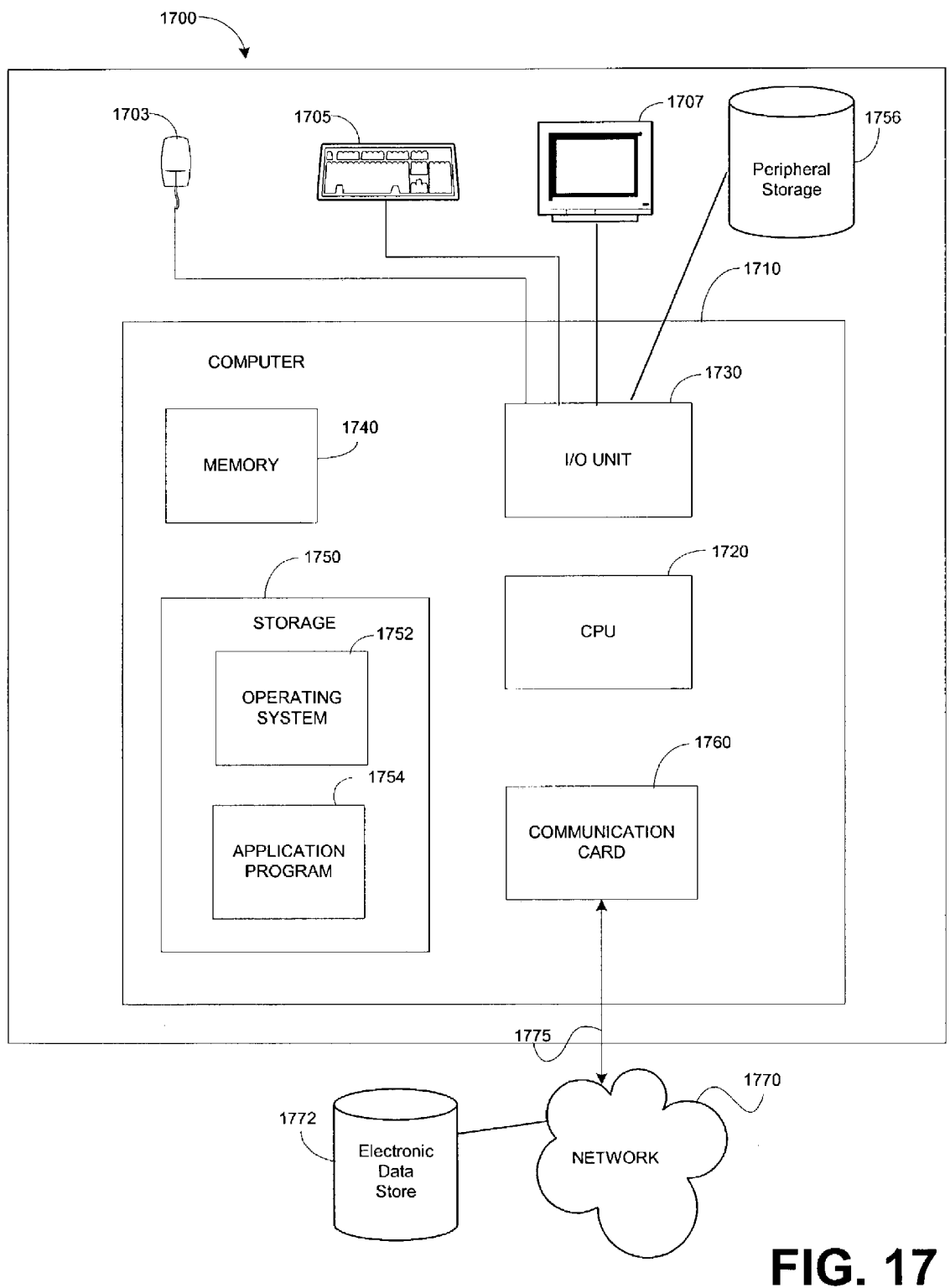
FIG. 17 is a block diagram illustrating an example of a computer system capable of implementing a process for managing customer churn.

FIG. 17 depicts a computer or another type of programmable system 1700 for managing customer churn. The computer 1700 may be used, for example, by a user executing the churn management process 1000 described in FIG. 10 and using the graphical user interface depicted in FIGS. 11-16.

The computer 1700 includes a variety of input/output (I/O) devices (a mouse 1703, a keyboard 1705, and a display 1707) and a general-purpose computer 1710 having a central processing unit (CPU) 1720, an I/O unit 1730, a memory 1740, and data storage 1750. Data storage 1750 may store machine-executable instructions, data, and various programs, such as an operating system 1752 and one or more application programs 1754, for implementing a process for managing customer churn, all of which may be processed by CPU 1720. Each computer program may be implemented in a high-level procedural or object-oriented programming language, or in assembly or machine language if desired; and, in any case, the language may be a compiled or interpreted language. Data storage device 1750 may be any form of non-volatile memory, including by way of example semiconductor memory devices, such as Erasable Programmable Read-Only Memory (EPROM), Electrically Erasable Programmable Read-Only Memory (EEPROM), and flash memory devices; magnetic disks, such as internal hard disks and removable disks; magneto-optical disks; and Compact Disc Read-Only Memory (CD-ROM).

The computer 1700 may include one or more peripheral online storage devices 1756 for storing customer churn information. Peripheral online storage device 1756 may use any storage media (including magnetic, optical or solid state storage media) or any type of storage device (including a drive, a microdrive, a compact disc (CD), a recordable CD (CD-R), a rewriteable CD (CD-RW), a flash memory, or a solid-state floppy disk card (SSFDC)).

The computer 1710 also may include a communications card or device 1760 (for example, a modem and/or a network adapter) for exchanging data with a network 1770 using a communications link 1775 (for example, a telephone line, a wireless network link, a wired network link, or a cable network). Examples of the network 1770 include the Internet, the World Wide Web, WANs, LANs, analog or digital wired and wireless telephone networks (e.g., ISDN ("Integrated Services Digital Network"), and DSL ("Digital Subscriber Line") including various forms of DSL such as SDSL ("Single-line Digital Subscriber Line"), ADSL ("Asymmetric Digital Subscriber Loop"), HDSL ("High bit-rate Digital Subscriber Line"), and VDSL ("Very high bit-rate Digital Subscriber Line")), radio, television, cable, satellite, and/or any other delivery mechanism for carrying data.

Other examples of system 1700 may include a handheld device, a workstation, a server, a device, a component, other equipment, or some combination of these capable of responding to and executing instructions in a defined manner. Any of the foregoing may be supplemented by, or incorporated in, ASICs (application-specific integrated circuits).

The computer 1710 may use the communications link 1775 to communicate over the network 1770 with an electronic data store 1772 connected to the network 1770. As shown, the computer 1710 may access and perform operations on data stored in the electronic data store 1772. Electronic data store 1772 may store customer churn information.

The description of the screens in FIGS. 11-16 refer to windows of a graphical user interface. The techniques and concepts described are not limited to being applicable only to a window for which a user may control the display position on a display device. A user's control over the display position of a window may include, for example, indirect or direct control of the coordinates of the display device at which the window is positioned, the size of the window, and the shape of the window. The techniques and concepts described also may be applicable to a graphical user interface that uses a pane that is displayed in a fixed position on a display device. A pane may be used in lieu of or in addition to a window to display various aspects of the graphical user interface described above.

Although the techniques and concepts described above refer to a using data from a data warehouse to identify valuable customers with a high likelihood-to-churn, data from transaction systems may be used. In some implementations, a combination of data may be used from multiple data sources, some of which may be transactional data sources and others may be a data warehouse, data mart or other types of analytical processing data repositories.

A number of implementations of the invention have been described. Nevertheless, it will be understood that various modifications may be made without departing from the spirit and scope of the invention. Accordingly, other implementations are within the scope of the following claims.

What is claimed is:

1. A computer program product tangibly embodied in a non-transitory computer-readable medium, the computer program product having instructions that, when executed, by at least one computer generate, on a display device, a graphical user interface for using a computer to manage customer loss, the graphical user interface being generated by:

developing a time-dependent prediction for each of several customers of a business enterprise using multiple likelihood to churn values predicted for each of the several customers over time using a customer churn model;

monitoring the developed time-dependent prediction for each of the several customers over time;

inferring, for each of the several customers, customer status in terms of whether the customer is an active customer or a lost customer by evaluating interactions of the customer with the business enterprise against multiple criteria that each identify a condition which suggests whether the customer remains an active customer, where the customer is determined to be an active customer when the interactions of the customer with the business enterprise satisfy at least one of the multiple criteria for an active customer and the customer is determined to be a lost customer when the interactions of the customer with the business enterprise do not satisfy any of the multiple criteria for an active customer;

based on the monitoring and the inferred customer status, comparing the developed time-dependent prediction for each of the several customers over time with the inferred customer status of each of the several customers over time;

adjusting the customer churn model based on the comparison of the developed time-dependent prediction for each of the several customers over time with the inferred customer status of each of the several customers over time;

determining customer churn information that includes a churn attribute that relates to customer churn of a set of customers of the business enterprise and multiple values for the churn attribute, each value being associated with a particular point within a period of time;

identifying several groups of customers within the set of customers of the business enterprise, each of the several groups of customers include multiple customers included in the set of customers of the business enterprise;

for each of the several groups of customers: accessing, for each customer included in the corresponding group, a likelihood to churn value predicted for the corresponding customer by applying the adjusted customer churn model to at least one attribute of the corresponding customer; and computing, using the accessed likelihood to churn values, a group likelihood to churn value that is descriptive of likelihood to churn of the customers of the business enterprise included in the corresponding group; displaying an overview display for customer churn information associated with the period of time, the customer churn information including the churn attribute that relates to customer churn of the set of customers of the business enterprise and the multiple values for the churn attribute, each value being associated with a particular point within the period of time for which the customer churn information is being displayed; and displaying a customer profile display for customer churn information associated with each of the several groups of customers for which customer churn information is displayed in the overview display, wherein:

the customer profile display includes, for each of the several groups of customers, the computed group likelihood to churn value that is descriptive of likelihood to churn of the customers of the business enterprise included in the corresponding group.

2. The computer program product of claim 1 wherein the overview display comprises an overview window wherein the display position of the overview window on a display device is controllable by a user.

3. The computer program product of claim 1 wherein the overview display comprises an overview pane wherein the display position of the overview pane on a display device is fixed.

4. The computer program product of claim 1 wherein the customer profile display comprises a customer profile window wherein the display position of the customer profile window on a display device is controllable by a user.

5. The computer program product of claim 1 wherein the customer profile display comprises a customer profile pane wherein the display position of the customer profile pane on a display device is fixed.

6. The computer program product of claim 1 wherein the attribute comprises a rate of customer churn for all customers of a business enterprise.

7. The computer program product of claim 1 wherein the attribute comprises an aggregated likelihood-to-churn based on a likelihood-to-churn for individual customers of a business enterprise.

8. The computer program product of claim 7 wherein the aggregated attribute comprises an aggregated likelihood-to-churn attribute based on the likelihood-to-churn for important customers of a business enterprise.

9. The computer program product of claim 8 wherein importance of a customer is based on a profitability value that represents the contribution of the customer to the business enterprise.

10. The computer program product of claim 1 wherein the attribute comprises an estimate of lost profits due to lost customers.

11. The computer program product of claim 1 wherein the customer profile information includes a likelihood-to-churn value for each customer group, the likelihood-to-churn value representing an average likelihood-to-churn for all customers included in the customer group.

12. The computer program product of claim 1 wherein the customer profile information includes a customer value attribute for each customer group, the customer value attribute representing an average customer value for all customers included in the customer group.

13. The computer program product of claim 1 wherein the customer profile information includes a customer satisfaction attribute for each customer group, the customer satisfaction attribute representing an average satisfaction value for all customers included in the customer group.

14. The computer program product of claim 1 wherein the customer profile information includes a customer loyalty attribute for each customer group, the customer loyalty attribute representing an estimate of customer loyalty for all customers included in the customer group.

15. A non-transitory computer-readable medium having embodied thereon a computer program, the program comprising instructions that when executed by at least one computer, cause the at least one computer to perform operations comprising:

developing a time-dependent prediction for each of several customers of a business enterprise using multiple likelihood to churn values predicted for each of the several customers over time using a customer churn model;

monitoring the developed time-dependent prediction for each of the several customers over time;

inferring, for each of the several customers, customer status in terms of whether the customer is an active customer or a lost customer by evaluating interactions of the customer with the business enterprise against multiple criteria that each identify a condition which suggests whether the customer remains an active customer, where the customer is determined to be an active customer when the interactions of the customer with the business enterprise satisfy at least one of the multiple criteria for an active customer and the customer is determined to be a lost customer when the interactions of the customer with the business enterprise do not satisfy any of the multiple criteria for an active customer;

based on the monitoring and the inferred customer status, comparing the developed time-dependent prediction for each of the several customers over time with the inferred customer behavior status of each of the several customers over time;

adjusting the customer churn model based on the comparison of the developed time-dependent prediction for each of the several customers over time with the inferred customer status of each of the several customers over time;

determining customer churn information that includes a churn attribute that relates to customer churn of a set of customers of the business enterprise and multiple values for the churn attribute, each value being associated with a particular point within a period of time;

identifying several groups of customers within the set of customers of the business enterprise, each of the several groups of customers include multiple customers included in the set of customers of the business enterprise;

for each of the several groups of customers: accessing, for each customer included in the corresponding group, a likelihood to churn value predicted for the corresponding customer by applying the adjusted customer churn model to at least one attribute of the corresponding; and computing, using the accessed likelihood to churn values, a group likelihood to churn value that is descriptive of likelihood to churn of the customers of the business enterprise included in the corresponding group; displaying a graphical user interface that includes: an overview display for customer churn information associated with the period of time, the customer churn information including the churn attribute that relates to customer churn of the set of customers of the business enterprise and the multiple values for the churn attribute, each value being associated with a particular point within the period of time for which the customer churn information is being displayed; and a customer profile display for customer churn information associated with each of the several groups of customers for which customer churn information is displayed in the overview display, wherein:

the customer profile display includes, for each of the several groups of customers, the computed group likelihood to churn value that is descriptive of likelihood to churn of the customers of the business enterprise included in the corresponding group.

16. The medium of claim 15 wherein the attribute comprises a rate of customer churn for all customers of a business enterprise.

17. The medium of claim 15 wherein the attribute comprises an aggregated likelihood-to-churn based on a likelihood-to-churn for individual customers of a business enterprise.

18. The medium of claim 17 wherein the aggregated attribute comprises an aggregated likelihood-to-churn attribute based on the likelihood-to-churn for important customers of a business enterprise.

19. The medium of claim 15 wherein the customer profile information includes a likelihood-to-churn value for each customer group, the likelihood-to-churn value representing an average likelihood-to-churn for all customers included in the customer group.

20. The medium of claim 15 wherein the customer profile information includes a customer value attribute for each customer group, the customer value attribute representing an average customer value for all customers included in the customer group.

21. A system for displaying a graphical user interface for managing customer loss, the system comprising:
a processor connected to a storage device and one or more input/output devices, wherein the processor is configured to perform operations comprising: developing a time-dependent prediction for each of several customers of a business enterprise using multiple likelihood to churn values predicted for each of the several customers over time using a customer churn model;
monitoring the developed time-dependent prediction for each of the several customers over time;
inferring, for each of the several customers, customer status in terms of whether the customer is an active customer or a lost customer by evaluating interactions of the customer with the business enterprise against multiple criteria that each identify a condition which suggests whether the customer remains an active customer, where the customer is determined to be an active customer when the interactions of the customer with the business enterprise satisfy at least one of the multiple criteria for an active customer and the customer is determined to be a lost customer when the interactions of the customer with the business enterprise do not satisfy any of the multiple criteria for an active customer;
based on the monitoring and the inferred customer status, comparing the developed time-dependent prediction for each of the several customers over time with the inferred customer status of each of the several customers over time;
adjusting the customer churn model based on the comparison of the developed time-dependent prediction for each of the several customers over time with the inferred customer status of each of the several customers over time;
determining customer churn information that includes a churn attribute that relates to customer churn of a set of customers of the business enterprise and multiple values for the churn attribute, each value being associated with a particular point within a period of time;
identifying several groups of customers within the set of customers of the business enterprise, each of the several groups of customers include multiple customers included in the set of customers of the business enterprise;
for each of the several groups of customers: accessing, for each customer included in the corresponding group, a likelihood to churn value predicted for the corresponding customer by applying the adjusted customer churn model to at least one attribute of the corresponding customer; and
computing, using the accessed likelihood to churn values, a group likelihood to churn value that is descriptive of likelihood to churn of the customers of the business enterprise included in the corresponding group; displaying a graphical user interface that includes:
an overview display for customer churn information associated with the period of time, the customer churn information including the churn attribute that relates to customer churn of the set of customers of the business enterprise and the multiple values for the churn attribute, each value being associated with a particular point within the period of time for which the customer churn information is being displayed;
and a customer profile display for customer churn information associated with each of the several groups of customers for which customer churn information is displayed in the overview display, wherein: the customer profile display includes, for each of the several groups of customers, the computed group likelihood to churn value that is descriptive of likelihood to churn of the customers of the business enterprise included in the corresponding group.

22. The computer program product of claim 1 wherein the graphical user interface is further generated by:
determining a lost customers attribute that relates to a number of customers lost from among the set of customers of the business enterprise and multiple values for the lost customers attribute, each value for the lost customers attribute being associated with a particular point within a first period of time for which the lost customers attribute is being displayed;
determining a churn rate attribute that relates to churn of the set of customers of the business enterprise and multiple values for the churn rate attribute, each value for the churn rate attribute being associated with a particular point within the first period of time for which the churn rate attribute is being displayed;
and determining a value-churn attribute that relates to a value-churn index of the set of customers of the business enterprise and multiple values for the value-churn attribute, each value for the value-churn attribute being associated with a particular point within a second period of time for which the value-churn attribute is being displayed, the second period of time for which the value-churn attribute is being displayed is different than the first period of time for which the lost customers attribute and the churn rate attribute are being displayed, wherein displaying the overview display for customer churn information comprises: displaying the determined lost customers attribute that relates to a number of customers lost from among the set of customers of the business enterprise and multiple values for the lost customers attribute, each value for the lost customers attribute being associated with a particular point within a first period of time for which the lost customers attribute is being displayed;
displaying the determined churn rate attribute that relates to churn of the set of customers of the business enterprise and multiple values for the churn rate attribute, each value for the churn rate attribute being associated with a particular point within the first period of time for which the churn rate attribute is being displayed;
and displaying the determined value-churn attribute that relates to a value-churn index of the set of customers of the business enterprise and multiple values for the value-churn attribute, each value for the value-churn attribute being associated with a particular point within a second period of time for which the value-churn attribute is being displayed, the second period of time for which the value-churn attribute is being displayed is different than the first period of time for which the lost customers attribute and the churn rate attribute are being displayed.

23. The computer program product of claim 1 wherein the graphical user interface is further generated by:

determining a customer-value attribute that relates to a customer-value index of the set of customers of the business enterprise and multiple values for the customer-value attribute, each value for the customer-value attribute being associated with a particular point within a period of time for which the customer-value attribute is being displayed; and determining a likelihood-to-churn attribute that relates to likelihood-to-churn of the set of customers of the business enterprise and multiple values for the likelihood-to-churn attribute, each value for the likelihood-to-churn attribute being associated with a particular point within the period of time for which the customer-value attribute and the likelihood-to-churn attribute are being displayed, wherein displaying the overview display for customer churn information comprises: displaying the determined customer-value attribute that relates to a customer-value index of the set of customers of the business enterprise and multiple values for the customer-value attribute, each value for the customer-value attribute being associated with a particular point within a period of time for which the customer-value attribute is being displayed;

and displaying the determined likelihood-to-churn attribute that relates to likelihood-to-churn of the set of customers of the business enterprise and multiple values for the likelihood-to-churn attribute, each value for the likelihood-to-churn attribute being associated with a particular point within the period of time for which the customer-value attribute and the likelihood-to-churn attribute are being displayed.

24. The computer program product of claim 1 wherein the graphical user interface is further generated by: determining an average customer value attribute that relates to average customer value for the set of customers of the business enterprise;

determining an average likelihood-to-churn attribute that relates to average likelihood-to-churn for the set of customers of the business enterprise;

determining an average loyalty index attribute that relates to an average loyalty value for the set of customers of the business enterprise;

determining an average satisfaction index attribute that relates to an average satisfaction value for the set of customers of the business enterprise;

determining an average revenue attribute that relates to an average revenue value for the set of customers of the business enterprise; and for each of the several groups of customers: determining a group average customer value attribute that relates to average customer value for the customers of the business enterprise included in the corresponding group;

determining a group average likelihood-to-churn attribute that relates to average likelihood-to-churn for the customers of the business enterprise included in the corresponding group;

determining a group average loyalty index attribute that relates to an average loyalty value for the customers of the business enterprise included in the corresponding group;

determining a group average satisfaction index attribute that relates to an average satisfaction value for the customers of the business enterprise included in the corresponding group; and determining a group average revenue attribute that relates to an average revenue value for the customers of the business enterprise included in the corresponding group, wherein displaying the customer profile display comprises: displaying the determined average customer value attribute that relates to average customer value for the set of customers of the business enterprise;

displaying the determined average likelihood-to-churn attribute that relates to average likelihood-to-churn for the set of customers of the business enterprise;

displaying the determined average loyalty index attribute that relates to an average loyalty value for the set of customers of the business enterprise;

displaying the determined average satisfaction index attribute that relates to an average satisfaction value for the set of customers of the business enterprise;

displaying the determined average revenue attribute that relates to an average revenue value for the set of customers of the business enterprise; and for each of the several groups of customers:

displaying the determined group average customer value attribute that relates to average customer value for the customers of the business enterprise included in the corresponding group;

displaying the determined group average likelihood-to-churn attribute that relates to average likelihood-to-churn for the customers of the business enterprise included in the corresponding group;

displaying the determined group average loyalty index attribute that relates to an average loyalty value for the customers of the business enterprise included in the corresponding group;

displaying the determined group average satisfaction index attribute that relates to an average satisfaction value for the customers of the business enterprise included in the corresponding group; and displaying the determined group average revenue attribute that relates to an average revenue value for the customers of the business enterprise included in the corresponding group.

25. The computer program product of claim 1: wherein the multiple criteria include a first criterion that identifies a first condition specifying that a customer is considered to be an active customer when the customer has made a purchase from the business enterprise within a first predetermined period of time and a second criterion that identifies a second condition specifying that a customer is considered to be an active customer when the customer has had at least one contact with the business enterprise within a second predetermined period of time;

wherein inferring, for each of the several customers, customer status in terms of whether the customer is an active customer or a lost customer by evaluating interactions of the customer with the business enterprise against multiple criteria that each identify a condition which suggests that the customer remains an active customer comprises: evaluating interactions of the customer with the business enterprise against the first criterion that identifies the first condition specifying that a customer is considered to be an active customer when the customer has made a purchase from the business enterprise within the first predetermined period of time;

evaluating interactions of the customer with the business enterprise against the second criterion that identifies the second condition specifying that a customer is considered to be an active customer when the customer has had at least one contact with the business enterprise within the second predetermined period of time; determining that the customer is an active customer when the evaluations reveal that the customer meets the first condition by having made a purchase from the business enterprise within the first predetermined period of time or that the customer meets the second condition by having had at least one contact with the business enterprise within the second predetermined period of time; and determining that the customer is a lost customer when the evaluations reveal that the customer does not meet the first condition by having not made a purchase from the business enterprise within the first predetermined period of time and that the customer does not meet the second condition by having not had at least one contact with the business enterprise within the second predetermined period of time.

26. The computer program product of claim 1:

wherein each criterion of the multiple criteria is associated with an order of priority relative to other of the multiple criteria; and wherein evaluating interactions of the customer with the business enterprise against multiple criteria that each identify a condition which suggests that the customer remains an active customer comprises evaluating interactions of the customer with the business enterprise against the multiple criteria in accordance with the order of priority set for each criterion of the multiple criteria.

\* \* \* \* \*